US008367746B2

(12) United States Patent
Manesis et al.

(10) Patent No.: US 8,367,746 B2
(45) Date of Patent: Feb. 5, 2013

(54) SILICONE HYDROGEL CONTACT LENS

(75) Inventors: Nick J. Manesis, San Ramon, CA (US); Arthur Back, Danville, CA (US)

(73) Assignee: Coopervision International Holding Company, St. Michael (BB)

( * ) Notice: Subject to any disclaimer, the term of this patent is extended or adjusted under 35 U.S.C. 154(b) by 1089 days.

(21) Appl. No.: 11/525,106

(22) Filed: Sep. 20, 2006

(65) Prior Publication Data

US 2007/0066706 A1 Mar. 22, 2007

Related U.S. Application Data

(63) Continuation-in-part of application No. 11/213,437, filed on Aug. 26, 2005, now abandoned.

(60) Provisional application No. 60/621,525, filed on Oct. 22, 2004, provisional application No. 60/604,961, filed on Aug. 27, 2004.

(51) Int. Cl.
*G02C 7/02* (2006.01)
*G02C 7/04* (2006.01)

(52) U.S. Cl. ... 523/106; 523/107; 424/429; 351/159.02; 351/159.33

(58) Field of Classification Search .................. 523/106, 523/107, 108; 351/160 H, 160 R, 159.02, 351/159.33; 424/429
See application file for complete search history.

(56) References Cited

U.S. PATENT DOCUMENTS

| | | | |
|---|---|---|---|
| 3,907,851 A | 9/1975 | Boersma et al. | |
| 4,099,859 A | 7/1978 | Merrill | |
| 4,121,896 A | 10/1978 | Shepherd | |
| 4,136,250 A | 1/1979 | Mueller et al. | |
| 4,182,822 A | 1/1980 | Chang | |
| 4,208,365 A | 6/1980 | LeFevre | |
| 4,217,038 A | 8/1980 | Letter et al. | |
| 4,246,389 A | 1/1981 | LeBoeuf | |
| 4,259,467 A | 3/1981 | Keogh et al. | |
| 4,260,725 A | 4/1981 | Keogh et al. | |
| 4,293,397 A | 10/1981 | Sata et al. | |
| 4,440,918 A | 4/1984 | Rice et al. | |
| 4,487,905 A | 12/1984 | Mitchell | |
| 4,605,712 A | 8/1986 | Mueller et al. | |
| 4,640,489 A | 2/1987 | Larsen | |
| 4,649,184 A | 3/1987 | Yoshikawa et al. | |
| 4,703,097 A | 10/1987 | Wingler et al. | |
| 4,711,943 A * | 12/1987 | Harvey, III | 526/279 |
| 4,879,072 A | 11/1989 | Bourset et al. | |
| 4,954,586 A | 9/1990 | Toyoshima et al. | |
| 5,010,141 A | 4/1991 | Mueller | |
| 5,023,305 A | 6/1991 | Onozuka et al. | |
| 5,034,461 A | 7/1991 | Lai et al. | |
| 5,070,169 A | 12/1991 | Robertson et al. | |
| 5,079,319 A | 1/1992 | Mueller | |
| 5,158,717 A | 10/1992 | Lai | |
| 5,258,490 A | 11/1993 | Chang | |
| 5,260,000 A | 11/1993 | Nandu et al. | |
| 5,274,008 A | 12/1993 | Lai | |
| 5,312,690 A | 5/1994 | Fukuda et al. | |
| 5,314,960 A | 5/1994 | Spinelli et al. | |
| 5,321,108 A | 6/1994 | Kunzler et al. | |
| 5,352,714 A | 10/1994 | Lai et al. | |
| 5,358,995 A | 10/1994 | Lai et al. | |
| 5,387,632 A | 2/1995 | Lai et al. | |
| 5,451,617 A | 9/1995 | Lai et al. | |
| 5,486,579 A | 1/1996 | Lai et al. | |
| 5,496,871 A | 3/1996 | Lai et al. | |
| 5,539,016 A * | 7/1996 | Kunzler et al. | 523/107 |
| 5,760,100 A | 6/1998 | Nicolson et al. | |
| 5,776,999 A | 7/1998 | Nicolson et al. | |
| 5,789,461 A | 8/1998 | Nicolson et al. | |
| 5,807,944 A | 9/1998 | Hirt et al. | |
| 5,817,924 A | 10/1998 | Tuomela et al. | |
| 5,849,811 A | 12/1998 | Nicolson et al. | |
| 5,945,498 A | 8/1999 | Hopken et al. | |
| 5,959,117 A | 9/1999 | Ozark et al. | |
| 5,962,548 A | 10/1999 | Vanderlaan et al. | |
| 5,965,631 A | 10/1999 | Nicolson et al. | |
| 5,969,076 A | 10/1999 | Lai et al. | |
| 5,981,675 A | 11/1999 | Valint et al. | |
| 5,998,498 A | 12/1999 | Vanderlaan et al. | |
| 6,020,445 A | 2/2000 | Vanderlaan et al. | |
| 6,043,328 A | 3/2000 | Domschke et al. | |
| 6,310,116 B1 | 10/2001 | Yasuda et al. | |
| 6,359,024 B2 | 3/2002 | Lai | |
| 6,367,929 B1 | 4/2002 | Maiden et al. | |
| 6,436,481 B1 * | 8/2002 | Chabrecek et al. | 427/488 |
| 6,638,991 B2 | 10/2003 | Baba et al. | |
| 6,649,742 B1 | 11/2003 | Better et al. | |
| 6,689,480 B2 | 2/2004 | Shimoyama et al. | |
| 6,727,336 B1 | 4/2004 | Ito et al. | |
| 6,849,671 B2 | 2/2005 | Steffen et al. | |
| 6,861,123 B2 | 3/2005 | Turner et al. | |
| 6,867,245 B2 | 3/2005 | Iwata et al. | |

(Continued)

FOREIGN PATENT DOCUMENTS

EP 0 330 616 6/1991
EP 0 330 617 7/1991

(Continued)

OTHER PUBLICATIONS

USPTO Office communication dated Mar. 14, 2008 in U.S. Appl. No. 11/213,437, filed Aug. 26, 2005.

(Continued)

*Primary Examiner* — Michael Pepitone

(74) *Attorney, Agent, or Firm* — Stout, Uxa, Buyan & Mullins; Frank J. Uxa

(57) ABSTRACT

Silicone hydrogel contact lenses are provided which have reduced modulus and contact angle properties, and which have acceptable wettabilities for use in daily wear and extended or continuous wear applications.

39 Claims, No Drawings

U.S. PATENT DOCUMENTS

| | | | |
|---|---|---|---|
| 6,891,010 | B2 | 5/2005 | Kunzler et al. |
| 6,902,812 | B2 | 6/2005 | Valint, Jr. et al. |
| 6,921,802 | B2 | 7/2005 | Kunzler et al. |
| 6,940,580 | B2 | 9/2005 | Winterton et al. |
| 6,943,203 | B2 | 9/2005 | Vanderlaan et al. |
| 6,951,894 | B1 | 10/2005 | Nicolson et al. |
| 6,992,118 | B2 | 1/2006 | Sulc et al. |
| 7,426,993 | B2 | 9/2008 | Coldrey et al. |
| 2002/0016383 | A1* | 2/2002 | Iwata et al. .................. 523/106 |
| 2002/0107324 | A1 | 8/2002 | Vanderlaan et al. |
| 2002/0120084 | A1 | 8/2002 | Valint et al. |
| 2002/0137811 | A1 | 9/2002 | Turek et al. |
| 2003/0008154 | A1 | 1/2003 | Aguado et al. |
| 2003/0039748 | A1 | 2/2003 | Valint et al. |
| 2003/0109390 | A1 | 6/2003 | Salpekar et al. |
| 2003/0109637 | A1 | 6/2003 | Kunzler et al. |
| 2003/0125498 | A1 | 7/2003 | McCabe et al. |
| 2003/0134132 | A1 | 7/2003 | Winterton et al. |
| 2003/0162862 | A1 | 8/2003 | McCabe et al. |
| 2004/0039077 | A1 | 2/2004 | Baba et al. |
| 2005/0053642 | A1 | 3/2005 | Ulbricht et al. |
| 2005/0154080 | A1 | 7/2005 | McCabe et al. |
| 2005/0165187 | A1 | 7/2005 | Kunzler et al. |
| 2005/0179862 | A1 | 8/2005 | Steffen et al. |
| 2005/0228065 | A1 | 10/2005 | Nicolson et al. |
| 2006/0001184 | A1 | 1/2006 | Phelan |
| 2006/0007391 | A1 | 1/2006 | McCabe et al. |
| 2006/0012751 | A1 | 1/2006 | Rosenzweig et al. |
| 2006/0072069 | A1 | 4/2006 | Laredo et al. |
| 2006/0074208 | A1 | 4/2006 | Laredo |
| 2007/0066706 | A1 | 3/2007 | Manesis et al. |
| 2007/0291223 | A1 | 12/2007 | Chen et al. |
| 2007/0296914 | A1 | 12/2007 | Hong et al. |
| 2008/0048350 | A1 | 2/2008 | Chen et al. |

FOREIGN PATENT DOCUMENTS

| | | |
|---|---|---|
| EP | 0584826 A2 | 3/1994 |
| EP | 0 908 476 | 4/1999 |
| EP | 0 908 744 | 4/1999 |
| GB | 1 399 301 | 7/1975 |
| JP | 60-3342 | 1/1985 |
| JP | A 63-297411 | 12/1988 |
| JP | 3-39928 | 2/1991 |
| JP | H3-39928 | 2/1991 |
| JP | A 5-19214 | 1/1993 |
| JP | 6-121826 | 5/1994 |
| JP | A 6-170857 | 6/1994 |
| JP | A 8-25378 | 1/1996 |
| JP | B2 2503028 | 3/1996 |
| JP | A 8-245737 | 9/1996 |
| JP | A 8-245790 | 9/1996 |
| JP | A 8-304746 | 11/1996 |
| JP | 11-320699 | 11/1999 |
| JP | 2001-201723 A | 7/2001 |
| JP | 2003-526707 A | 9/2003 |
| WO | WO 91/04283 | 4/1991 |
| WO | WO 93/05085 | 3/1993 |
| WO | WO 01/27174 A1 | 4/2001 |

OTHER PUBLICATIONS

USPTO Office communication dated Dec. 23, 2008 in U.S. Appl. No. 11/213,437, filed Aug. 26, 2005.
USPTO Office communication dated Jun. 9, 2008 in U.S. Appl. No. 11/761,272, filed Jun. 11, 2007.
Amendment filed in U.S. Appl. No. 11/761,272 on Oct. 9, 2008 and attached Declaration Under 37 CFR 1.132.
USPTO Office communication dated Dec. 23, 2008 in U.S. Appl. No. 11/761,272.
Amendment After Final filed with the USPTO on Feb. 20, 2009 in U.S. Appl. No. 11/761,272.
USPTO Office communication dated Mar. 16, 2009 in U.S. Appl. No. 11/761,272.
Supplemental Amendment After Final filed with the USPTO on Mar. 19, 2009 in U.S. Appl. No. 11/761,272.
USPTO Notice of Allowance, Examiner-Initiated Interview Summary and Examiner's Amendment mailed Apr. 6, 2009 in U.S. Appl. No. 11/761,272.
USPTO Office communication dated Aug. 6, 2008 in U.S. Appl. No. 11/761,324, filed Jun. 11, 2007.
Amendment filed with the USPTO on Oct. 16, 2008 in U.S. Appl. No. 11/761,324.
USPTO Office communication dated Nov. 7, 2008 in U.S. Appl. No. 11/761,324.
Amendment filed with the USPTO on Nov. 26, 2008 in U.S. Appl. No. 11/761,324.
USPTO Office communication dated Dec. 8, 2008 in U.S. Appl. No. 11/761,324.
Amendment After Final filed with the USPTO on Dec. 23, 2008 in U.S. Appl. No. 11/761,324.
USPTO Office communication dated Jan. 9, 2009 in U.S. Appl. No. 11/761,324.
Amendment filed with the USPTO on Jan. 30, 2009 in U.S. Appl. No. 11/761,324.
USPTO Office communication dated Mar. 5, 2009 in U.S. Appl. No. 11/761,324.
Amendment After Final filed with the USPTO on Mar. 19, 2009 in U.S. Appl. No. 11/761,324.
USPTO Office communication dated Mar. 25, 2009 in U.S. Appl. No. 11/761,324.
USPTO Office communication dated Apr. 21, 2008 in U.S. Appl. No. 11/761,332, filed Jun. 11, 2007.
Amendment filed with the USPTO on Oct. 14, 2008 in U.S. Appl. No. 11/761,332.
USPTO Office communication dated Jan. 8, 2009 in U.S. Appl. No. 11/761,332.
Holden et al., "Critical Oxygen Levels to Avoid Corneal Edema for Daily and Extended Wear Contact Lenses", Invest. Ophthalmol. Vis. Sci., 25:1161-1167 (1984).
Terry R.L. et al., "CCLRU Standards for Success of Daily and Extended Wear Contact Lenses", Optom. Vis. Sci. 70(3):234-243, 1993.
Jones et al., "Silicone hydrogel contact lenses Part 1 Evolution and current status", pp. 26-32, Sep. 20, 2002.
Grant et al., "The Oxygen Transmissibility Profile of Siloxane Hydrogel Contact Lenses", Poster presentation obtained from the internet in Oct. 2005. Applicant is unaware of the publication date of the poster, but according to document properties of the electronic poster, it was created and last modified in 2002.
Steffen et al., "Finding the Comfort Zone With the Newest Silicone Hydrogel Technology", *Contact Lens Spectrum*, obtained from the internet in Oct. 2005. Applicant is unaware of the publication date of the article.
Nicolson et al., "Soft contact lens polymers: an evolution", *Biomaterials* 22:3273-3283, 2001.
Baush & Lomb® PureVision™ Contact Lenses, Product information page from internet—Vision Care Home Page—page dated Apr. 21, 1999 (internet address unknown).
"Ciba promotes merits of new 30-night lens", Article. Applicant is unaware of publisher and date.
Grobe III, et al., "Surface chemical structure for soft contact lenses as a function of polymer processing" *Journal of Biomedical Materials Research*, vol. 32, pp. 45-54 (1996).
International Search Report dated Nov. 5, 2007, in related PCT application No. PCT/US05/30491.
Office Action dated Aug. 31, 2009 in related U.S. Appl. No. 11/213,437, filed Aug. 26, 2005.
Office Action dated Dec. 23, 2008 in related U.S. Appl. No. 11/213,437, filed Aug. 26, 2005.
Office Action dated Mar. 14, 2008 in related U.S. Appl. No. 11/213,437, filed Aug. 26, 2005.

\* cited by examiner

SILICONE HYDROGEL CONTACT LENS

CROSS-REFERENCE TO RELATED APPLICATIONS

This application is a continuation-in-part of U.S. application Ser. No. 11/213,437, filed Aug. 26, 2005, now abandoned, which claims the benefit of U.S. Application No. 60/621,525, filed Oct. 22, 2004, and U.S. Application No. 60/604,961, filed Aug. 27, 2004, the contents of each of which are herein incorporated by reference in their entireties.

BACKGROUND OF THE INVENTION

The present invention relates to contact lenses which are wearable, on a continuous basis, for periods of time, for example, for at least about 12 hours or at least about one day or up to about 30 days or longer. In particular, the invention relates to flexible, hydrophilic silicon-containing contact lenses which have advantageous combinations of properties.

Contact lenses are fundamentally classified into soft and hard type lenses. Hard contact lenses are literally hard and can be somewhat uncomfortable to wear. On the other hand, soft contact lenses are more comfortable to wear, but are commonly removed from the eye at the end of each day. Soft contact lenses are classified as hydrogel lenses and non-hydrogel lenses.

Conventional soft hydrogel contact lenses are often composed of copolymers of hydrophilic monomers, such as hydroxyethylmethacrylate, N-vinylpyrrolidone and the like, and can be prepared by lathe-cutting methods, spin casting methods, cast molding methods or combinations thereof, followed by a swelling treatment in a physiological saline and/or phosphate buffer solution to obtain lenses with water contents of about 20% or about 30% to about 80% by weight.

Soft silicon or silicone hydrogel contact lenses have been suggested for continuous wear for extended periods of time. For example, some silicone hydrogel contact lenses are intended to be worn during the day and removed overnight or to be worn overnight. Some silicone hydrogel contact lenses can be worn continuously for about two weeks, and some silicone hydrogel contact lenses can be worn continuously for about one month or about thirty days. Such continuous wear lenses have had relatively high oxygen permeabilities to provide for oxygen access to the cornea during the extended wearing of such lenses.

Oxygen permeability (Dk) is an important factor in contact lens design to maintain ocular health for contact lens wearers. As established by Holden and Mertz in 1984, a minimum of $87 \times 10^{-9}$ (cm ml $O_2$)/(sec ml mmHg) oxygen transmissibility is required for hydrogel contact lenses to limit overnight edema to 4% (Holden et al., Invest. Ophtalmol. Vis. Sci., 25:1161-1167 (1984)). Physical properties such as oxygen flux (j), oxygen permeability (Dk), and oxygen transmissibility (Dk/t) are used in referring to properties of contact lenses. Oxygen flux can be defined as a volume of oxygen passing through a specified area of a contact lens over a set amount of time. The physical units of oxygen flux can be described as μl $O_2$ (cm$^2$ sec). Oxygen permeability can be defined as the amount of oxygen passing through a contact lens material over a set amount of time and pressure difference. Physical units of oxygen permeability can be described as 1 Barrer or $10^{-11}$ (cm$^3$ $O_2$ cm)/(cm$^3$ sec mmHg). Oxygen transmissibility can be defined as the amount of oxygen passing through a contact lens of specified thickness over a set amount of time and pressure difference. The physical units of oxygen transmissibility can be defined as $10^{-9}$ (cm ml $O_2$)/(ml sec mmHg). Oxygen transmissibility relates to a lens type with a particular thickness. Oxygen permeability is a material specific property that can be calculated from lens oxygen transmissibility.

Oxygen transmissibility is commonly measured using polarographic and coulometric techniques known by persons or ordinary skill in the art. Oxygen permeability can be calculated by multiplying the oxygen transmissibility (Dk/t) of a lens by the mean thickness of the measured area. However, it appears that the polarographic techniques may not provide accurate measurements for high Dk silicone hydrogel contact lenses, such as silicone hydrogel contact lenses having a Dk greater than about 100 barrers. The variability associated with polarographic techniques may be related to the issue that for silicone hydrogel lenses having a Dk greater than 100 barrers, the measurements tend to plateau at Dk values greater than 100. The coulometric technique is frequently used to measure the Dk of lenses that are believed to have Dks greater than 100 barrers.

Prior art soft silicon-containing hydrophilic contact lenses with higher water contents tend to have reduced or lower oxygen permeabilities. For example, a silicone hydrogel contact lens available under the tradename, Focus Night & Day (available from CIBA Vision Corporation), has a water content of about 24% and a Dk of about 140 barrers. Another silicone hydrogel contact lens available under the tradename, O2 Optix (available from CIBA Vision Corporation), has a water content of about 33% and a Dk of about 110 barrers. Another silicone hydrogel contact lens available under the tradename, Acuvue Oasys (available from Johnson & Johnson), has a water content of about 38% and a Dk of about 105 barrers. Another silicone hydrogel contact lens available under the tradename, PureVision (available from Bausch & Lomb), has a water content of about 36% and a Dk of about 100 barrers. Another silicone hydrogel contact lens available under the tradename, Acuvue Advance (available from Johnson & Johnson), has a water content of about 46-47% and a Dk of about 65 barrers. In comparison, a non-silicone hydrogel contact lens available under the tradename, Acuvue2 (available from Johnson & Johnson), has a water content of about 58% and a Dk of about 25 barrers.

In addition, existing silicone hydrogel contact lenses have a modulus from between about 0.4 to about 1.4 MPa. For example, the Focus Night & Day contact lens has a modulus of about 1.4 MPa, the PureVision contact lens has a modulus of about 1.3 MPa, the O2 Optix has a modulus of about 1.0 MPa, the Advance contact lens has a modulus of about 0.4 MPa, and the Oasys contact lens has a modulus of about 0.7 MPa. In general, for existing silicone hydrogel contact lenses, as the Dk increases, the modulus of the lens increases.

To help improve the properties of silicone hydrogel contact lenses, some lenses have been produced which include one or more surface treatments or surface modifications to attempt to make the lens surfaces more hydrophilic or more wettable. Other lenses have been produced which include an interpenetrating network of polyvinylpyrollidone and a silicon-containing polymer.

However, existing silicone hydrogel contact lenses, for example, such contact lenses including treated surfaces or surfaces which have not been treated, do not have desirable surface wettabilities. For example, the Focus Night and Day contact lens has an advancing contact angle of about 67° and a receding contact angle of 52°, the PureVision contact lens has an advancing contact angle of about 67° and a receding contact angle of 49°, the O2 Optix contact lens has an advancing contact angle of about 60°-70° and a receding contact angle of 51°, and the Advance contact lens has an advancing contact angle of about 96°-107° and a receding contact angle of 49°. In comparison, non-silicone hydrogel contact lenses have advancing contact angles of about 60°-65° and receding contact angles of about 47°-50°.

It is important that contact lenses be comfortable and safe to wear. For example, silicone hydrogel contact lenses should be comfortable and safe to wear for daily use, for overnight wear, and/or for wearing on an extended or continuous wear basis. One problem that arises in extended or continuous wear contact lenses is adhesion of the lens to the cornea during lens wearing which can result in wearer discomfort, eye irritation, corneal staining and/or other damage to the eye. Although lenses with high water contents are softer and more comfortable to wear, such prior art lenses may not have one or more properties useful to provide comfortable and safe wearing of the contact lenses. For example, existing contact lenses may not have a desirable Dk, a desirable surface wettability, a desirable modulus, a desired design, and/or a desirable water content. For example, silicone hydrogel contact lenses with a low modulus typically have low wettability. Thus, although such lenses are less stiff or softer, the low or reduced wettability of the lenses causes an increased risk of damage to the eye, for example, such as discussed hereinabove.

To reduce stromal anoxia during daily wear of contact lenses, it is desirable to produce a lens that has an oxygen transmissibility of at least about 45. Lenses, such as certain existing silicone hydrogel contact lenses, with an oxygen transmissibility greater than 50 have been developed to reduce stromal anoxia during daily wear. In addition, to enhance user comfort and wearability, silicone hydrogel contact lenses having reduced modulus, for example, less than 1.0 MPa, are very advantageous.

There continues to be a need for new silicone hydrogel contact lenses which have advantageous combinations of properties such as, enhanced flexibility or less stiffness, better wettability, and/or better lens designs.

SUMMARY OF THE INVENTION

New contact lenses have been invented. For example, contact lenses which comprise a hydrophilic silicon-containing polymeric component or material (e.g., silicone hydrogel contact lenses) have been invented. The present lenses can be understood to be associated with one, two, or more of the following features, a natural wettability (e.g., an untreated surface wettability), a high Dk, a high water content, a low modulus, and designs that facilitate wearing the contact lenses with reduced discomfort. For example, the present lenses have one or more of the foregoing properties when compared to existing silicone hydrogel contact lenses. Or, stated differently, the present lenses have different values of one or more of the foregoing properties relative to existing silicone hydrogel contact lenses. For example, the wettability of the present lenses is determined by measuring the advancing contact angles and/or receding contact angles of the present lenses and comparing such angles and/or one or more values, for example, sums of such angles and differences between such angles, with corresponding angles and/or values from existing contact lenses. The properties of the present lenses lead to reduced discomfort and enhanced safety, for example, reduced risk of eye damage, to the lens wearer wearing the present contact lenses compared to existing silicone hydrogel contact lenses.

In certain embodiments, the present silicone hydrogel contact lenses have one or more surfaces that are not treated to become more hydrophilic, have no wetting agents, and/or are associated with low or no protein or lipid deposition.

The present silicone hydrogel contact lenses may comprise surfaces that have a greater wettability than existing silicone hydrogel contact lenses, such as those silicone hydrogel contact lenses described herein. As understood by persons of ordinary skill in the art, the wettability of a contact lens surface can be determined by measuring an advancing contact angle and/or a receding contact angle, for example, using conventional methods, such as those described herein. In general, lower advancing/receding contact angles correspond to enhanced surface wettability. For purposes of comparison, existing commercially available silicone hydrogel contact lenses, such as those described herein, have surfaces that provide an advancing contact angle in a range of about 60° to about 110°. In one embodiment, the present silicone hydrogel contact lenses may comprise surfaces, such as the anterior surface and/or posterior surface, that have advancing contact angles less than 60°. In certain embodiments, the present silicone hydrogel contact lenses have surfaces that have advancing contact angles of less than about 55° or less than about 50° to about 45° or about 40° C. or less.

In certain embodiments, the lens body has an advancing contact angle, and a receding contact angle of 49° or less, and a contact angle hysteresis of 45° or less, for example, about 30° or less or about 15° or less or about 13° or less. The difference between the advancing and receding contact angles is often called or referred to as contact angle hysteresis.

In certain embodiments, the lens body has an advancing contact angle, and a receding contact angle the sum of which is less than 119°, or less than 117°, or 115° or less, or about 110° or less, or about 105° or less.

In certain embodiments, the present contact lenses, for example, silicone hydrogel contact lenses, comprise soft lens bodies which comprise at least one hydrophilic silicon-containing polymeric material, and have a modulus less than 1 MPa, and an advancing contact angle and a receding contact angle such that the sum of the advancing contact angle and the receding contact angle is in a range of more than 94° to less than 119°, and a contact angle hysteresis of less than 30°. The sum of the advancing and receding angles may be in the range of 95° to 115° or may be about 110° or less or about 105° or less. The contact angle hysteresis may be less than 20°, or less than 15° or less than 13°. The lens bodies of these contact lenses may have one or more surfaces which are surface treated or modified or may have one or more surfaces which are not surface treated or modified. The present contact lenses with the combinations of sums of advancing and receding contact angles, and differences being advancing and receding contact angles (contact angle hysteresis) provide acceptable or desirable surface wettability which facilitates and/or enhances the usefulness of these contact lenses, for example, in daily wear service and/or in extended or continuous wear service.

In general, the present contact lenses have been found to provide one or more advantages, for example, and without limitation, lens bodies which include hydrophilic silicone-containing polymeric materials, low modulus lens bodies and lens bodies which include an acceptably high degree of surface wettability, for example, natural surface wettability, for example, as shown by the advancing and receding contact angles and/or the sums and/or the differences of such angles, as discussed elsewhere herein.

The present lenses may provide improvement or enhancement in patient comfort compared to existing silicone hydrogel contact lenses, as discussed herein. For example, whereas only about 15% of patients wearing existing silicone hydrogel contact lenses reported satisfactory comfort wearing the lenses, about 40% of patients wearing the present silicone hydrogel contact lenses reported satisfactory comfort wearing the lenses.

In certain embodiments, the present contact lenses, e.g., silicone hydrogel contact lenses, comprise a soft lens body comprising at least one hydrophilic polymeric component or material. The lens body has a modulus of less than 1.0 MPa or less than 0.8 MPa or less than 0.7 MPa or in a range of about 0.2 to less than 1.0 MPa.

In certain embodiments, the present silicone hydrogel contact lenses have widely varying Dk's and/or water contents. For example, and without limitation, the present contact lenses may have a relatively high Dk and a relatively high water content compared to existing silicone hydrogel contact lenses, such as those described herein.

For example, the present silicone hydrogel contact lenses may have an equilibrium water content from about 30% to about 60% by weight, and a Dk from about 200 barrers to about 80 barrers. In one embodiment, a silicone hydrogel contact lens has an equilibrium water content from 20% to 70% by weight, and a Dk from about 220 barrers to about 60 barrers. One example of the present silicone hydrogel contact lenses has an equilibrium water content of about 30% by weight and a Dk of about 200 barrers. In certain embodiments, the present lens has an equilibrium water content greater than 20% by weight and a Dk greater than about 160 barrers. Another example of the present silicone hydrogel contact lenses has a water content of about 60% by weight and a Dk of about 80 barrers. In one embodiment, a silicone hydrogel contact lens has a water content greater than 50% by weight and a Dk greater than about 70 barrers. Yet another example of the present silicone hydrogel contact lenses has a water content of about 48% by weight and a Dk greater than about 100 barrers.

Certain embodiments of the present silicone hydrogel contact lenses have a relatively higher Dk and a relatively lower modulus compared to existing silicone hydrogel contact lenses, as described herein. For example, the present silicone hydrogel contact lenses may have a Dk of at least about 50 or at least about 70 or at least about 90 or at least about 100 or at least 120 barrers or at least about 130 barrers or at least about 150 barrers or at least about 200 or more barrers, such as up to about 250 barrers or about 300 barrers or more, and a modulus of about 0.2 MPa or about 0.4 MPa to about 0.8 MPa or less than 1.0 MPa. One example of a silicone hydrogel contact lens has a Dk greater than about 70 barrers and a modulus from about 0.3 MPa to less than about 0.8 MPa or less than 1.0 MPa. In certain embodiments, the present silicone hydrogel contact lenses have a Dk of about 100 and a modulus of about 0.4 MPa. In other embodiments, the present silicone hydrogel contact lenses have a Dk of about 200 and a modulus of about 0.8 MPa. In yet other embodiments, the present silicone hydrogel contact lenses have a Dk of about 150 barrers and a modulus of about 0.8 MPa. In comparison, the existing, commercially available Acuvue Advance silicone hydrogel contact lens has a modulus of about 0.4 MPa and a Dk of about 70. The existing, commercially available Focus Night & Day silicone hydrogel contact lens has a modulus of about 1.4 and a Dk of about 130. Thus, certain embodiments of the present silicone hydrogel contact lenses have a relatively greater Dk, a relatively higher water content, and are relatively softer than existing silicone hydrogel contact lenses.

In one specific embodiment, the present contact lenses have a Dk from about 115 to about 149 barrers, a water content of about 48% by weight, and a modulus of about 0.84 MPa. For example, a contact lens may have a Dk greater than about 105 barrers, a water content greater than about 45% by weight and a modulus greater than about 0.8 MPa. In certain embodiments, the present silicone hydrogel contact lenses have a water content greater than about 50% by weight, a modulus from about 0.3 to about 0.5 MPa, and a Dk from about 70 to about 100 barrers. For example, a contact lens may have a water content greater than about 50% by weight, a modulus from about 0.2 MPa to about 0.6 MPa, and a Dk greater than about 60 barrers. Such embodiments may be useful as daily wear silicone hydrogel contact lenses. In additional embodiments, the present silicone hydrogel contact lenses have a Dk of at least about 120 barrers and a water content of at least about 48% by weight. Such embodiments may be useful as extended or continuous wear silicone hydrogel contact lenses.

The present lenses are hydrophilic, and have unique and advantageous combinations of properties as described herein. The combinations of properties are helpful in evaluating appropriate conditions for wearing the present lenses. For example, certain combinations of properties, such as high water content, relatively lower Dk, low modulus and one or more advancing and/or receding contact angle properties, for example, as described herein, may be desirable or acceptable for daily wear silicone hydrogel contact lenses, such as lenses that can be worn overnight without cleaning, but that are typically disposed of on a daily basis. Other combinations of properties, such as high Dk, high water content, low modulus and one or more advancing and/or receding contact angle properties, for example, as described herein, may be effective in facilitating the use of such lenses in continuous or extended wear applications, such as for more than one night, such as for at least about five days, for example about two weeks or more, or at least about one month.

The present contact lenses can be relatively easily and cost effectively produced. Using such lenses provides advantages, such as, vision correction with reduced lens handling and maintenance, continuous or extended wearing of contact lenses, while being ophthalmically compatible and providing for wearer comfort and safety.

In one broad aspect, contact lenses comprise lens bodies that are configured to be placed or disposed on a cornea of an animal or human eye. The lens bodies comprise a hydrophilic silicon-containing polymeric material or materials. The lens bodies have Dk's or oxygen permeabilities of greater than about 70 barrers or about 80 barrers or about 100 barrers or about 105 barrers or about 110 barrers or about 115 barrers or about 120 barrers or about 125 barrers or about 130 barrers or about 150 barrers or about 180 barrers or about 200 barrers or more and equilibrium water contents of greater than about 15% or about 30% or about 35% or about 40% or more by weight. The present contact lenses are ophthalmically compatible, and advantageously are adapted and structured and/or are effective for continuous wear on a cornea of a human or animal eye, for example, for 1 day or 5 days or at least about 5 days or more.

In one embodiment, the lens body, that is the ophthalmically compatible lens body, of the present contact lens, does not have, for example, is produced without, surface treatment or modification, such as on the anterior face and/or posterior face of the lens body. In certain prior art lenses such surface treatment was required to enhance surface wettability and/or one or more other properties of the lenses. The present lenses, advantageously have ophthalmic compatibility without requiring such surface treatment or modification. For example, the present lenses can be produced by polymerizing a lens precursor composition in a contact lens mold assembly to form a contact lens that can undergo extraction and packaging steps without requiring a post-polymerizing surface modification to remain sufficiently wettable when placed on an eye of an individual. In addition, some embodiments of the present lenses do not require polyvinylpyrollidone (PVP), such as a PVP containing interpenetrating network, and/or other additives, to obtain the desired wettability of the present lenses.

In certain embodiments, the present lenses are free of a surface modification or surface treatment and/or do not include a PVP-containing interpenetrating network. In other words, the present contact lenses can be produced by polymerizing or curing a lens precursor composition in a contact lens mold and extracting and hydrating the polymerized lens. The hydrated lens produced in the mold includes an anterior surface and/or posterior surface that is sufficiently wettable to be worn on an eye with reduced discomfort or without substantial discomfort, to a lens wearer, and without requiring a surface treatment. Thus, embodiments of the present invention may be understood to be non-surface treated silicone hydrogel contact lenses.

In one embodiment, the lens bodies of the present contact lenses may have a combination of properties, including an effective or appropriate ionoflux to substantially inhibit, or even substantially prevent, corneal staining, for example, corneal staining more severe than superficial or moderate corneal staining, after the contact lens is worn continuously on a cornea of a human or animal eye for 8 hours or more, for example, for about 1 day, or about 5 days, or about 10 days, or about 20 days or about 30 days or longer.

The oxygen permeability of the present lens bodies may be measured with the contact lens in the wet or fully hydrated state. The oxygen permeability or Dk is expressed as barrers, that is $10^{-10}$ (ml $O_2$ mm)/(cm$^2$ sec. mm Hg) or $10^{-10}$ ml $O_2$ mm cm$^{-2}$ sec.$^{-1}$ mm Hg$^{-1}$. Preferably, the lens body has a Dk of at least about 80 barrers or about 100 barrers or about 105 barrers or about 110 barrers or about 115 barrers or about 120 barrers or about 125 barrers or about 130 barrers, or at least about 150 barrers or about 180 barrers, or even at least about 200 barrers or more. The larger values of Dk of the present lens bodies are highly useful in that oxygen is substantially accessible to the cornea of an eye even when a contact lens is located on the cornea continuously from a prolonged period of time, as described herein.

The present lens bodies may have effective or appropriate structural or mechanical characteristics, such as modulus, tear strength, elongation and/or one or more of the like properties, to withstand continuous contact lens wear for extended or prolonged periods of time, as described herein. For example, present lens bodies may have effective or appropriate modulus for use as continuous wear contact lenses.

The present contact lenses include a lens body comprising a hydrophilic silicon-containing polymeric material. In one embodiment, the polymeric material comprise units from a silicon-containing monomer, for example, from two silicon-containing macromers having different molecular weights, and preferably different chemical structures. Such an embodiment may be particularly useful for continuous wear silicone hydrogel contact lenses, such as silicone hydrogel contact lenses that can be worn continuously for about 30 days. In another embodiment, the present contact lenses comprises only one silicon-containing macromer having a relatively high molecular weight. This embodiment, that is the embodiment comprising one silicon-containing macromer may be particularly useful for daily wear silicone hydrogel contact lenses that can be worn while sleeping, but that are typically discarded on a daily basis.

Each and every feature described herein, and each and every combination of two or more of such features, is included within the scope of the present invention provided that the features included in such a combination are not mutually inconsistent. In addition, any feature or combination of features may be specifically excluded from any embodiment of the present invention.

These and other aspects and advantages of the present invention will become apparent in the following detailed description, examples and claims.

DETAILED DESCRIPTION

The present contact lenses have unique and advantageous combinations of properties which facilitate the use of such lenses for prolonged wearing of the contact lenses by lens wearers. For example, the present lenses can be worn while a person sleeps. In certain embodiments, the lenses have properties that facilitate the use of the lenses for daily wear, which can include overnight wear. In other embodiments, the lenses have properties that facilitate use of the lenses in continuous or extended wear applications, such as for more than 5 days (e.g., for about 30 days). The present contact lenses provide advantages, such as, vision correction with reduced lens handling and maintenance, continuous or extended wearing of contact lenses, and being ophthalmically compatible and/or providing for wearer comfort and safety.

In one broad aspect, the present invention provides silicone hydrogel contact lenses that comprise a non-surface treated lens body or, in certain embodiments, a surface treated lens body. The lens body comprises a hydrophilic, silicon-containing polymeric material, and has at least one of an oxygen permeability, a water content, a surface wettability, for example, one or more contact angle properties as set forth herein, a modulus, and a design that is effective in facilitating ophthalmically compatible wearing of the contact lens by a lens wearer at least for one day. In certain embodiments, the lens body has two or more of the foregoing features, such as oxygen permeability, water content, surface wettability, modulus, and design. In additional embodiments, the lens body has three or more of the foregoing features. As used herein, ophthalmically compatible can be understood to refer to the wearing of the present lenses by a lens wearer with little or no discomfort, and little or no occurrence of features associated with existing silicone hydrogel contact lenses, such as lipid or protein deposition, corneal staining, and the like. In certain embodiments, the lens body has all of the aforementioned properties useful in lenses that are worn for at least one day, including daily wear lenses. In further embodiments, the lens body has all of the aforementioned properties useful in lenses that are worn for about thirty days, including continuous wear contact lenses.

In one aspect of the present invention, soft contact lenses comprising a hydrophilic silicon-containing polymeric material, for example silicone hydrogel contact lenses, are provided which have wettabilities which are very useful in providing very useful and effective contact lenses, for example, daily wear and extended wear contact lenses.

As noted previously, in general lower advancing/receding contact angles correspond to enhanced surface wettability.

In one embodiment, a contact lens is provided which comprises a soft lens body having an anterior surface and a posterior surface at least one of which is not surface treated. The lens body comprises at least one hydrophilic silicon-containing polymeric material and has a contact angle hysteresis of less than 15° and a modulus of less then 1 MPa. The contact angle hysteresis may be less than 13°. Having the advancing contact angle and receding contact angle of a lens body being of relatively similar values, for example, such that the contact lens hysteresis or difference between the advancing contact angle and receding contact angle is less than 15°, provides substantial advantages, for example, wettability advantages to the contact lens. With the present contact lenses having low hysteresis, the anterior and posterior surfaces of the contact lenses have ophthalmically acceptable surface wettabilities. The advancing contact angle may be about 70° or less, or about 65° or less or about 60° or less.

In one useful embodiment, a contact lens is provided which comprises a soft lens body having an anterior surface and a posterior surface at least one of which is not surface treated. The lens body comprises at least one hydrophilic silicon-containing polymeric material and has a receding contact angle of 49° or less, a contact angle hysteresis of 45° or less and a modulus of less than 1 MPa. In this embodiment the lens body may have a contact angle hysteresis of less than about 30° or less or about 15° or less or about 13° or less. It has been found that such lens bodies have advantageous wettability properties which are very useful in facilitating both daily wear and continuous or extended wear of soft contact lenses comprising hydrophilic silicon-containing polymeric material, such as silicone hydrogel contact lenses.

In addition, with regard to the above-noted embodiments, the fact that the soft lens body includes one or more surfaces which are not surface treated, for example, to enhance wettability, provides further advantages in that lens manufacturing costs are reduced because no surface treatment is required. Thus, the present invention provides contact lenses having useful, acceptable and even desired wettability without the need for surface treatments to enhance wettability.

In one embodiment, the present contact lenses comprise a soft lens body having an anterior surface and a posterior surface and comprising at least one hydrophilic silicon-containing polymeric material, a modulus of less than 1 MPa, and an advancing contact angle and a receding contact angle in which the sum of the advancing contact angle and the receding contact angle is in the range of more than 94° to less than 117°, and the contact angle hysteresis is less than 30°. In this embodiment of the present invention, the lens body may include surfaces which have not been treated to enhance wettability or may be surface treated to enhance wettability. The sum of the advancing contact angle and the receding contact angle may be in the range of 95° to 115°. The sum of the advancing contact angle and the receding contact angle may be about 110° or less or about 105° or less. The contact angle hysteresis may be less than 20°, or less than 15° or less than 13°. The contact lenses in accordance with this embodiment have very useful properties, for example, wettability properties, which facilitate such lenses being effectively used in daily wear and continuous or extended wear applications.

Chabrecek et al U.S. Pat. No. 6,436,481 discloses certain silicon-containing contact lenses which have certain advancing and receding contact angles. The present lenses are different and distinct from the lenses described in Chabrecek et al U.S. Pat. No. 6,436,481. For example, the Chabrecek et al patent discloses contact lenses which are surface treated to enhance wettability. However, the present lenses even with surface treated surfaces are different and distinct from the lenses disclosed in the Chabrecek et al patent, for example, have different contact angle properties, relative to the Chabrecek et al lenses. In addition, the present lenses without surface treatment are even further different and distinct from the surface treated lenses of the Chabrecek et al patent.

In general, it has been found that lenses having the contact angle properties disclosed herein have useful, enhanced and/or desirable surface wettabilities relative to lenses which do not have such properties.

Certain embodiments, such as the present daily wear lenses, of the contact lenses comprise a hydrophilic silicon-containing polymeric material that comprises units from a hydrophilic silicon-containing macromer, such as one hydrophilic silicon-containing macromer. Other embodiments, including the present continuous wear contact lenses, of the contact lenses comprise a hydrophilic silicon-containing polymeric material that comprises units from two different hydrophilic silicon-containing macromers, each macromer having a different molecular weight.

Embodiments of the present silicone hydrogel contact lenses comprise a lens body having an oxygen permeability of at least about 70 barrers, a water content of at least about 30% by weight, a modulus less than 1.0 MPa, and a contact angle on a surface of the lens body less than about 60 degrees. In some embodiments, the lens body has an oxygen permeability greater than about 110 barrers. In some embodiments, the lens body has a water content greater than about 45% by weight. In some embodiments, the lens body has a modulus less than about 0.9 MPa. For example, one embodiment of the present silicone hydrogel contact lenses comprises a lens body that has an oxygen permeability of at least about 115 barrers, a water content of about 48% by weight, and a modulus of about 0.84 MPa. As another example, one embodiment of the present silicone hydrogel contact lenses comprises a lens body that has an oxygen permeability from about 70 barrers to about 100 barrers, a water content of at least about 50% by weight, and a modulus from about 0.3 MPa to about 0.5 MPa. These and other features of the present lenses are included in the following description and summary above.

In another broad aspect, the present invention is directed to contact lenses which comprise lens bodies that are configured to be placed or disposed on a cornea of an animal or human eye. The lens bodies comprise a hydrophilic silicon-containing polymeric material or materials. The lens bodies have Dk's or oxygen permeabilities of greater than about 70 barrers or about 75 barrers or about 80 barrers or about 85 barrers or about 90 barrers or about 95 barrers or about 100 barrers or about 105 barrers or about 110 barrers or about 115 barrers or about 120 barrers or about 125 barrers or about 130 barrers or about 150 barrers or about 180 barrers or about 200 barrers, and equilibrium water contents of greater than about 15% or about 30% or about 35% or about 40% by weight. The present contact lenses are ophthalmically compatible, as defined herein, and are advantageously adapted and structured and/or are effective for continuous wear on a cornea of a human or animal eye, for example, for about 1 day or for about 5 days or for at least about 5 days or about 10 days or about 20 days or about 30 days or more.

As used herein, the term "ophthalmically compatible" as applied to the present contact lenses and lens bodies may also be understood to mean that such lenses and lens bodies are effective to provide the following features in continuous wear applications: (1) allow oxygen to reach the cornea of an eye wearing the lens in an amount sufficient for long term corneal health; (2) cause no substantial undue corneal swelling or edema in an eye wearing the lens, for example, cause no more than about 5% or about 10% corneal swelling after being worn on a cornea of an eye during an overnight sleep; (3) allow movement of the lens on the cornea of an eye wearing the lens sufficient to facilitate tear flow between the lens and the eye, in other words, does not cause the lens to adhere to the eye with sufficient force to prevent substantially normal lens movement; (4) allow wearing of the lens on the eye without undue or significant discomfort and/or irritation and/or pain, for example, allow wearing of the lens with substantial comfort and/or substantial freedom from irritation and/or substantial freedom from pain; and (5) inhibit or substantially prevent lipid and/or protein deposition sufficient to substantially interfere with the functioning of the lens during wear, for example, inhibit or substantially prevent lipid and/or protein deposition sufficient to cause the lens wearer to remove the lens because of such deposition. Advantageously, such ophthalmically compatible contact lenses and lens bodies in addition inhibit, reduce, or even substantially prevent, corneal staining after the lens is continuously worn on a cornea of an eye, for example, during an overnight sleep.

Corneal staining is a measure of corneal epithelium cell damage or destruction. The corneal epithelium is about 50 microns thick and comprise 5-7 layers of cells. The epithelium is constantly regenerated with the outermost layer of cells sloughing off into the tear film with the assistance of blinking. The innermost cell layer is pushed forward by new cell growth beneath and this layer gradually transforms to become the outermost layer of cells following repeated cycles of new growth over about 7 days. Damaged or dead epithelial cells are stained when exposed to sodium fluorescein. Thus, the degree of such staining can be used to measure the degree of cell damage/destruction. Some degree of corneal staining is often present with the wearing of conventional daily-wear and continuous wear contact lenses, and can occur even without contact lens wear.

The use of sodium fluorescein is routinely used in clinical practice to identify the degree of corneal epithelial damage. This is because sodium fluorescein can passively accumulate into damaged cells or pool in areas where cells have been removed. One can determine the clinical significance of epithelial damage and, therefore, its management by evaluating both the extent of area of cornea which shows fluorescein staining as well as whether the fluorescein is able to penetrate and diffuse into the corneal stroma. The faster the time taken for the diffusion to occur into the stroma the greater number of layers have been damaged. Furthermore, the pattern of the staining is also a crucial indicator of the likely aetiology of the corneal staining e.g. superficial punctuate keratitis, superior epithelial arcuate lesions (SEALs), foreign body tracking, arcuate staining, etc. Grading scales have been developed for quantifying corneal staining and are well known. See Terry R L et al, "Standards for Successful Contact Lens Wear," Optom. Vis. Sci. 70(3):234-243, 1993.

In one embodiment, the present lenses are structured and/or have combinations of properties so as to substantially inhibit, even substantially prevent, corneal staining after the lens is continuously worn during an overnight sleep or for at least 1 day or at least 5 days or at least 10 days or at least 20 days or at least 30 days. For example, the wearing of the present lenses advantageously may result in corneal staining (staining grading scale of 1.0 or more) incidences of less than about 30% or about 20% or about 10%, based on a representative population of lens wearers.

In the immediately preceding paragraph, the type of corneal staining considered is inferior corneal dehydration staining. This staining characteristically occurs in the inferior half of the cornea where the dehydration of the tear film on the anterior surface of the lens is greatest and during wear creates an osmotic gradient that draws water from the contact lens. If the lens is thin enough or the material has a propensity to lose water, e.g., has a relatively high ionoflux, then the osmotic gradient can be sufficiently great to dehydrate the tear film underneath the contact lens and subsequently dehydrate the corneal epithelium. This dehydration of the epithelium results in corneal damage and therefore corneal staining by fluorescein. This staining is usually limited to the superficial 2-3 layers of the epithelium and spread over the inferior portion of the cornea, but if the stimulus is sufficiently great, damage can be deep and severe allowing rapid diffusion of fluorescein into the stroma. The staining can occur rapidly within a few hours of lens insertion but usually takes 4-6 hours or more. Likewise the epithelial damage can resolve rapidly within 2-3 hours once the stimulus for dehydration has been removed. The greater the stimulus the faster the staining will be induced and the longer it will take to heal but typically it would not take more than 4-6 hours to resolve.

In one embodiment, the lens bodies of the present contact lenses may have combinations of properties, including effective or appropriate ionofluxes, to substantially inhibit, or even substantially prevent, corneal staining, as described herein. In one useful embodiment, the present lens bodies have ionofluxes of no greater than about 5, more preferably no greater than about 4 or about 3, for example, no greater than about 2 or about 1 or less. Ionoflux is expressed as $10^{-3}$ mm$^2$/min.

The ophthalmically compatible lens bodies, of the present contact lenses may have no surface treatment or modification, for example, may be produced without surface treatment or modification, such as on the anterior face and/or posterior face of the lens body, to enhance surface wettability and/or one or more other beneficial properties of the lens bodies. Advantageously, no such surface treatment or modification is provided on either the anterior face or the posterior face of the present ophthalmically compatible lens bodies. By not having such surface treatment or modification, the lens manufacturing process is less complex and expensive, and more efficient. Further, with no such surface treatment/modification, the present lens bodies advantageously have more reproducible and/or more homogeneous surfaces. In addition, the lens wearer is not exposed to a surface treatment on the lens, which may, in and of itself, cause eye irritation and the like.

The oxygen permeability of the present lens bodies is measured with the contact lens in the wet or fully hydrated state. The oxygen permeability or Dk is expressed as $10^{-10}$ (ml O$_2$ mm)/(cm$^2$ sec mm Hg) or barrer. Preferably, the lens body has a Dk of at least about 70 barrers or about 75 barrers or about 80 barrers or about 85 barrers or about 90 barrers or about 95 barrers or about 100 barrers or about 105 barrers or about 110 barrers or about 115 barrers or about 120 barrers or about 125 barrers or about 130 barrers, or about 150 barrers or about 180 barrers or even at least about 200 barrers or more. The relatively high values of Dk of the present ophthalmically compatible lens bodies are highly advantageous in that oxygen is substantially accessible to the cornea of an eye even when a contact lens is located on the cornea continuously for a prolonged period of time, as described herein.

An additional mechanical property that may be effective in providing the present ophthalmically compatible contact lenses and lens bodies is elongation. The present lens bodies have sufficient elongations to facilitate lens handling ease, lens structural integrity, lens wear comfort, effective lens movement on the cornea and the like benefits. Lens bodies with insufficient elongation often suffer deficiencies in one or more of these areas. In a very useful embodiment, the present lens bodies have elongations of at least about 90% or about 100% or about 120%. Lens bodies having elongations of at least about 180% or about 200% are very useful.

The Dk values of the present lens bodies, together with the equilibrium water contents and/or the relatively low ionofluxes and/or the relatively high elongations of the present lens bodies effectively facilitate ophthalmic compatibility of the present contact lenses and/or enhanced safety and comfort of the wearer of the present contact lenses, making continuous wear of such lenses more beneficial for the lens wearer.

Moreover, in addition to the present ophthalmically compatible lens bodies having useful or effective Dk values and equilibrium water contents, and advantageously relatively low ionofluxes, such lens bodies preferably have sufficient structural or mechanical characteristics, such as modulus to reduce lens/eye interactions such as SEALs, contact lens papillary conjunctivitis (CLPC) and the like, tear strength, and/or one or more of the like mechanical properties, to allow or at least facilitate the lens bodies being able to withstand continuous contact lens wear for extended or prolonged periods of time, as described herein.

The present ophthalmically compatible lens bodies have sufficient modulus for use as continuous wear contact lenses. In one useful embodiment, the modulus of the lens body is less than 1.0 MPa and more preferably about 0.8 MPa or less or about 0.5 MPa or less or about 0.4 MPa or less or about 0.3 MPa or less. For example, one embodiment of the present lenses has a modulus of about 0.84 MPa. Another embodiment of the present lenses has a modulus from about 0.3 MPa to about 0.5 MPa. Lens bodies which have sufficient modulus for use as continuous wear contact lenses, but reduced modulus relative to prior art continuous wear lenses, for example, less than 1.0 MPa, are advantageous, for example, for the comfort of the wearer of the continuous wear contact lens.

In a particularly useful aspect of the present invention, the present contact lenses include a lens body comprising a hydrophilic silicon-containing polymeric material. In one embodiment, the polymeric material comprises units from at least two silicon-containing macromers having different molecular weights, and preferably different chemical structures. Advantageously, one of the macromers has a number average molecular weight greater than about 5,000 or greater than about 8,000 or greater than about 10,000. In another embodiment, the polymeric material comprises units from only one silicon-containing macromer. For example, an embodiment of the present lenses comprises units of a silicon-containing macromer having a number average molecular weight of at least about 10,000.

The polymeric material may comprise units from a silicon-containing macromer having a number average molecular weight of less than about 5,000, for example, less than about 3,000 or less than about 2,000.

When units from two silicon-containing macromers are included in the polymeric material, such macromers advantageously have number average molecular weights which differ by at least about 3000 or about 5000, more preferably by at least about 10,000. In one useful embodiment, units from a high molecular weight silicon-containing macromer are present in the polymeric material in a greater amount by weight than are units of a low molecular weight silicon-containing macromer. For example, the weight ratio of high molecular weight macromer to low molecular weight macromer used to produce the present lens bodies may range from about 1.5 or about 2 to about 5 or about 7.

Without wishing to limit the invention to any particular theory of operation, it is believed that the use of two different molecular weight silicon-containing macromers in producing the present lens bodies is advantageous in providing appropriate or effective high oxygen permeability and appropriate or effective equilibrium water content and/or relatively low ionoflux while providing lens bodies effective for use in continuous wear contact lenses, for example, ophthalmically compatible contact lenses that can be worn for about thirty days, if desired. The use of different molecular weight silicon-containing macromers provides compatibility with the other components used to produce the lens bodies, and may provide a degree of heterogeneity in the present lens bodies, for example, on a molecular level, that at least facilitates providing a lens body having a desirable combination of physical properties which facilitates the lens body being highly advantageous for use in a continuous wear contact lens. In other embodiments comprising units from one silicon-containing macromer, appropriate lens properties can be obtained that facilitate use of the lenses on a daily basis, such as for overnight wear.

In one useful embodiment, one of the silicon-containing macromers, preferably the low molecular weight macromer, is mono-functional, that is it comprises only one group per molecule which participates in the polymerization reaction to form the silicon-containing polymeric material. Without wishing to limit the invention to any particular theory of operation, it is believed that the mono-functional macromer facilitates or enhances component compatibility and/or heterogeneity, for example, on a molecular level, of the polymeric material. That is, the morphology of the polymeric material of the lens body is believed to be sufficiently non-uniform or heterogeneous such that different phase domains are present in the polymeric material. This enhanced heterogeneous morphology is believed to enhance the ophthalmic compatibility of the polymeric material and/or to increase at least one of the Dk and the equilibrium water content and/or reduce the ionoflux, while maintaining or even reducing the modulus of the polymeric material, relative to a similar polymeric material comprising units from only one silicon-containing macromer or relative to a similar polymeric material comprising units from two silicon-containing macromers both of which have at least two functional groups per molecule.

In any event it has been found that contact lenses with unique and advantageous combinations of properties, which combinations of properties make the present lenses ophthalmically compatible, and advantageously highly effective for continuous or extended wear, can surprisingly be provided by selecting and processing macromers and monomers, as described herein, into lens bodies of contact lenses.

There is no limitation in a composition of the contact lenses of the present invention so long as the lenses have the combinations of properties and/or perform in daily wear applications or continuous or extended wear applications as set forth herein.

In one embodiment, contact lenses in accordance with the present invention include a polymer containing units from a hydrophilic siloxanyl methacrylate shown by formula I.

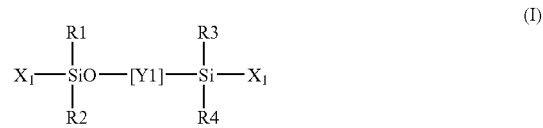

wherein, $X_1$ is a polymerizable substituent shown by the following formula:

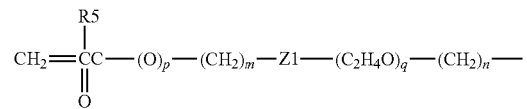

wherein, R1, R2, R3 and R4 are groups independently selected from hydrocarbon groups having 1 to about 12 carbon atoms and a siloxanyl group, such as a trimethylsiloxy group; and the structure [Y1] is a polysiloxane backbone comprising not less than 2 siloxane units; R5 is a hydrogen or a methyl group; Z1 is a group selected from —NHCOO—, —NHCONH—, —OCONH—R6-NHCOO—, —NH-CONH—R7-NHCONH— and —OCONH—R8-NH-CONH—, with R6, R7 and R8 independently selected from hydrocarbon groups having 2 to about 13 carbon atoms; m is an integer from 0 to about 10; n is an integer from about 3 to about 10; p is 0 when m is 0 and 1 when m is 1 or greater; and q is an integer from 0 to about 20.

In formula I, the structural unit Y1 may have the following formula

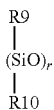

wherein R9 and R10 are groups selected from hydrocarbon groups having 1 to about 12 carbon atoms, for example, methyl groups, hydrocarbon groups substituted with one or more fluorine atoms, trimethylsiloxy groups, and hydrophilic substituents, and may be different from each other in the sequential chain; and r is an integer from about 7 to about 1000.

Use of such a hydrophilic siloxanyl methacrylate in accordance with the present invention provides contact lenses with high oxygen permeability, reduced deposition of proteins and lipids, superior or enhanced maintenance of lens water wettability during continuous lens wear, acceptable lens movement on the cornea of an eye, and reduced adhesion to a cornea.

In one embodiment, at least one of R1, R2, R3 and R4 may be selected from the groups shown by the following formulas (1a), (2a) and (3a):

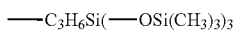
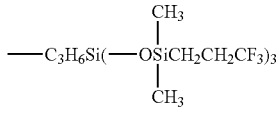
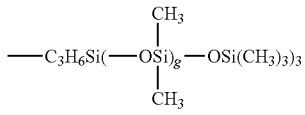

wherein, g is an integer from 1 to about 10.

One or more hydrophilic substituents may be included in the silicon-containing monomers and may be, for example, selected from linear or cyclic hydrocarbon groups linked with at least one substituent selected from hydroxyl groups and oxyalkylene groups, such as groups shown by the following formulas (3b) and (4b):

$$—R21(OH)_i \quad (3b)$$

wherein, R21 is a hydrocarbon group having about 3 to about 12 carbon atoms and may have —O—, —CO— or —COO— group inserted between carbon atoms; provided that the number of hydroxyl groups on the same carbon atom is limited to only one, and i is an integer larger than 1;

$$—R22-(OR23)_j—OZ2 \quad (4b)$$

wherein R22 is a hydrocarbon group having about 3 to about 12 carbon atoms and may have —O—, —CO— or —COO— group inserted between carbon atoms; R23 is a hydrocarbon group having about 2 to about 4 carbon atoms and the number of carbon atoms may be different from each other when j is not less than 2; j is an integer from 1 to about 200; Z2 is a group selected from hydrogen, hydrocarbon groups having about 1 to about 12 carbon atoms and —OOCR24, where R24 is a hydrocarbon group having about 1 to about 12 carbon atoms.

Examples of hydrophilic groups comprise, without limitation: monohydric alcohol substituents such as —C3H6OH, —C8H16OH, —C3H6OC2H4OH, —C3H6OCH2CH(OH)C3, —C2H4COOC2H4OH, —C2H4COOCH2CH(OH)C2H5 and the like; polyhydric alcohol substituents such as —C3H6OCH2CH(OH)CH2OH, —C2H4COOCH2CH(OH)CH2OH, —C3H6OCH2C(CH2OH)3 and the like; and polyoxyalkylene substituents such as —C3H6(OC2H4)4OH, —C3H6(OC2H4)30OH, —C3H6(OC2H4)10OCH3, —C3H6(OC2H4)10, —(OC3H6)10OC4H9 and the like. Among these, particularly useful groups comprise: alcohol substituents such as —C3H6OH, —C3H6OCH2CH(OH)CH2OH and —C3H6OC2H4OH; and polyoxyethylene substituents such as —C3H6(OC2H4)kOH and —C3H6(OC2H4)LCH3 wherein each of k and l independently is an integer from about 2 to about 40, preferably about 3 to about 20, from the viewpoints of superior hydrophilicity and oxygen permeability.

One or more fluorine-containing substituents provide staining resistance to the polymeric material, but an excess substitution may impair hydrophilicity. A hydrocarbon substituent having 1 to about 12 carbon atoms linked with fluorine atoms is very useful. Such useful fluorine-containing groups comprise, without limitation: 3,3,3-trifluoropropyl group, 1,1,2,2-tetrahydrofluorooctyl group, 1,1,2,2-tetrahydroperfluorodecyl group and the like. Among these, 3,3,3-trifluoropropyl group is very useful in view of the hydrophilicity and oxygen permeability obtained in the resulting lens body.

Besides the hydrophilic substituents and the fluorine-containing substituents, substituents linked to silicon atoms may comprise, without limitation, hydrocarbon groups having one to about 12 carbon atoms, trimethylsiloxy groups and the like, and may be the same or different from each other. A very useful group is an alkyl group having 1 to about 3 carbon atoms, and methyl group is particularly useful.

In the general formula I, m advantageously is an integer from 0 to about 4. If m is about 5 or greater, the monomer may become too hydrophobic to be compatible with the other monomers, giving a cloudiness during polymerization and difficulty in homogeneous mixing of the monomers. In the formula (3a), if g is greater than about 10, the monomer may have reduced compatibility with the other monomers.

The above described hydrophilic siloxanyl methacrylate may be synthesized by reacting 2-isocyanatoethyl methacrylate with siloxanylalkyl alcohol.

The present contact lenses may have equilibrium water contents in a range of about 25-60% by weight, comprise hydrophilic silicon-containing polymeric material, and have oxygen permeabilities, expressed as Dk, of not less than about 80 or about 90 or about 100 or about 110 or about 120. The lenses may provide one or more, for example, at least 2 or 3 or more, and advantageously all, of the following: reduced adsorption of proteins and lipids to the inner part of lens; easy lens care, acceptable lens movement on the eye, acceptable stability in lens shape, flexibility and wear comfort, thus enabling use in continuous wear applications. In one very useful embodiment, the present contact lenses are sufficiently ophthalmically compatible to be effective for continuous wear for at least 5 days or at least 10 days or at least 20 days or at least 30 days.

Water contents less than 5% or less than 15% by weight are often undesirable due to an easy adsorption of lipids to lens, potentially resulting in adhesion of the lens to the cornea of the eye wearing the lens. Water contents over 60% are often undesirable, giving the lens low strength, lens dehydration, poor scratch resistance in handling, easy fracture and high adsorption of proteins. Lenses with oxygen permeabilities lower than a Dk of about 80 are undesirable in continuous wear lenses. Lenses with tensile modulus less than about $0.2 \times 10^7$ dyne/cm² (MPa) are often undesirable due to relative instability in lens shape and difficulty in lens handling. Lenses with tensile modulus over about $1.5 \times 10^7$ dyne/cm² (MPa) or about $2 \times 10^7$ dyne/cm² (MPa) are undesirable, for example, because of a significant decrease in lens movement on the cornea and an increased occurrence of adhesion to the cornea, lens flexure problems, comfort issues during lens wearing and the like concerns.

Among other useful hydrophilic silicon-containing monomers for the contact lenses of the present invention are those having the structures shown by the following formulas Ia and Ib because lenses from polymeric materials including units for such monomers, for example, together with units of other silicon-containing monomers, provide a well-balanced combination of properties, including, but not limited to, water content, oxygen permeability and modulus, together with less deposition of proteins and lipids, and are advantageously ophthalmically compatible:

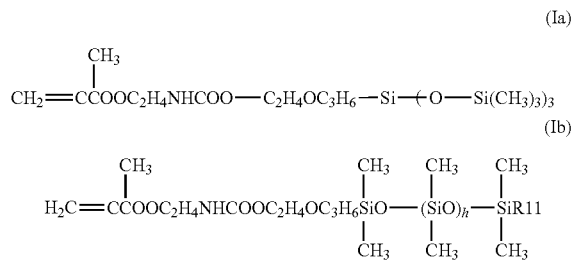

wherein h is an integer from about 8 to about 70 and R11 is a non-polymerizable or non-functional group, for example, a hydrocarbon group having about 1 to about 6 carbon atoms. In one very useful embodiment R11 is —C₄H₉. The compound identified in formula (Ib), in one embodiment, may be considered a macromer, for example, having a molecular weight in a range of about 1,000 to about 3,000 or about 5,000. The integer h is selected to provide a macromer with the desired molecular weight. Such a macromer is particularly useful in combination with another silicon-containing macromer having a higher molecular weight, as described elsewhere herein.

For example, and without limitation, a compound of the general formula I, for example, by proper selection of the value for "r", can be a macromer having a number average molecular weight of at least about 5000 or about 8,000 or about 10,000 to about 25,000 or more. Such a high molecular weight macromer can be used in combination with a low molecular weight macromer, for example, as illustrated by formula Ib, to produce lens bodies for contact lenses which are sufficiently ophthalmically compatible to be effective in continuous wear applications, as described elsewhere herein. In one embodiment, the use of the combination of such high and low molecular weight silicon-containing macromers to produce a contact lens body provides for enhanced ophthalmic compatibility and/or enhanced effectiveness in such continuous wear applications relative to a substantially identical contact lens body produced without one of the high molecular weight macromer or the low molecular weight macromer.

Any polymer which contains units from one or more hydrophilic silicon-containing monomers and/or macromers described herein can be used in the contact lenses of the present invention. For example, the polymer may include copolymers with the following copolymerizable compounds: acrylic monomers such as methyl acrylate, ethyl acrylate and acrylic acid; methacrylic monomers such as methyl methacrylate, ethyl methacrylate, 2-hydroxyethyl methacrylate and methacrylic acid; siloxane monomers such as tris(trimethylsiloxy)silylpropyl methacrylate, bis(trimethylsiloxy)methylsilylpropyl methacrylate, pentamethyldisiloxanepropyl methacrylate, tris(trimethylsiloxy)silylpropyloxyethyl methacrylate, and tris(polydimethylsiloxy)silylpropyl methacrylate; fluorosiloxane monomers such as tri(dimethyltrifluoropropylsiloxy)silylpropyl methacrylate; fluoroalkyl monomers such as 2,2,2-trifluoroethyl methacrylate, 2,2,3,3,3-pentafluoropropyl methacrylate and hexafluoroisopropyl methacrylate; fluoroalkyl and fluoroalkylether monomers containing hydroxyl group such as 1,1,2,2-tetrafluoroethoxy-2-hydroxypropyl methacrylate; hydrophilic monomers such a N-vinylpyrrolidone, N,N'-dimethylacrylamide and N-vinyl-N-methylacetamide; crosslinkable monomers such as ethylene glycol dimethacrylate, tetraethylene glycol dimethacrylate and tetramethyldisiloxanebis(propylmethacrylate).

Among these, copolymers with siloxane methacrylates, fluoroalkylsiloxane methacrylates, fluoroalkyl methacrylates, fluoroalkylether methacrylates containing hydroxyl groups, hydrophilic monomers, crosslinkable monomers with two or more unsaturated groups within a molecule and siloxane macromers with polymerizable unsaturated groups at molecular ends are preferable because of well-balanced physical properties such as oxygen permeability, stain deposition resistance and mechanical strength. Preferable hydrophilic monomers in the present invention are amide monomers containing N-vinyl group, and N-vinylpyrrolidone or N-vinyl-N-methylacetamide, in particular, can provide a contact lens with superior surface wettability.

An example, without limitation, of such a contact lens comprises a polymer material derived from about 30% to about 70% or about 80% by weight of hydrophilic silicon-containing monomer(s) or macromer(s), about 5% to about 50% by weight of N-vinylpyrrolidone, 0% to about 25% by weight of N-vinyl N-methylacetamide, 0% to about 15% by weight of 2-hydroxybutyl methacrylate, 0 to about 10% by weight isobornyl methacrylate, 0% to about 15% methyl methacrylate, by weight and about 0.005% to about 5% by weight of a crosslinker compound.

The contact lenses of the present invention can be manufactured by conventional lens manufacturing methods. Such methods comprise, for example and without limitation a method by lathe-cutting of polymer block followed by polishing, a method to cast a monomer (and a macromer) composition into a mold with corresponding lens shape followed by polymerization, and a method to form only one face of lens by casting method using a polymerization mold then finish the other face by lathe-cutting and polishing method, etc.

Polymeric materials comprising units of a hydrophilic polysiloxane monomer shown by the general formula II can be used for the contact lenses of the present invention:

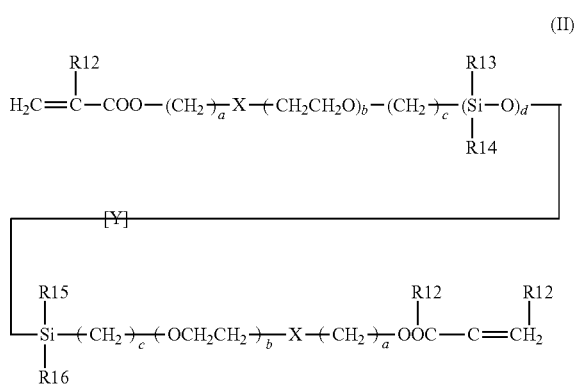

(II)

wherein, R12 is hydrogen or methyl group; each of R13, R14, R15 and R16 is independently selected from hydrocarbon groups having 1 to about 12 carbon atoms and trimethylsiloxy groups; Y is selected from combinations of the structural units (I') and (II') shown below, with the ratio of the structural unit (I') and the structural unit (II') being about 1:10 to about 10:1 and total number of the structural units (I') and (II') being from about 7 to about 200 or about 1000; each of a and c independently is an integer from 1 to about 20, d is an integer from 2 to about 30; b is an integer from 0 to about 20; X is —NH-COO— group or —OOCNH—R16-NHCOO— group, wherein R16 is a hydrocarbon group having about 4 to about 13 carbon atoms:

wherein, each of R17 and R18 is independently a hydrocarbon group having 1 to about 12 carbon atoms or fluorinated hydrocarbon group having 1 to about 12 carbon atoms, provided that at least one of R17 and R18 is a fluorinated hydrocarbon group; and each R19 and R20 is independently a hydrocarbon group or an oxygen-containing group, provided that at least one of R19 and R20 is an oxygen-containing group. Very useful oxygen containing groups for use as R19 and/or R20 comprise, without limitation

and

wherein e and f is an integer from about 2 to about 40, preferably about 2 to about 20.

The monomer of formula II can be considered a macromer, for example, a bifunctional macromer. For example, the molecular weight of the macromer of formula II can be controlled by controlling the number of structural units (I') and (II') in the macromer. In one useful embodiment, the formula II macromer has a relatively high molecular weight, for example, at least about 5000, and preferably in a range of about 10,000 to about 25,000 or more (number average molecular weight). The formula II macromer can be used alone, that is as the only silicon-containing monomer, in the present contact lenses. Advantageously, the high molecular weight macromer is used in combination with a low molecular weight macromer, as described elsewhere herein to form the polymeric material included in the present lenses or lens bodies.

In this embodiment, the units from monomer(s) or macromer(s) may make up about 30% or about 40% to about 70% or about 80% by weight of the polymeric material.

In the event that both high and low molecular weight silicon-containing macromers are used, the high molecular weight macromer comprises at least about 20% or about 30% or about 40% by weight of the polymeric materials. In one useful embodiment, units from the combination of the high molecular weight macromer and the low molecular weight macromer are at least about 30% or about 40% or about 50% by weight of the polymeric material.

The above described monomer or macromer of Formula II may be copolymerized with one or more other monomers and/or macromers, for example, as described elsewhere herein.

A contact lens comprising the above described polysiloxane monomer or monomers (macromer or macromers) as a main or primary component can be manufactured by conventional lens manufacturing methods such as the casting method in which a monomer composition is injected into a polymerization mold with a corresponding lens shape followed by a polymerization. A lens manufactured by using a mold made of a material with polar groups at the surface of the mold, such as molds made of ethylene-vinyl alcohol (EVOH) copolymer, polyamide, and polyethylene terephthalate, are preferred. Such molds are believed to be effective in facilitating the formation of a thick stable hydrophilic layer at the surface of the lens body, little or no change in surface characteristics during continuous or extended wear of the lens, together with substantially stable lens performance, such as superior water wettability and reduced deposition of proteins and lipids during such wear. Advantageously, lenses produced in such molds, including EVOH molds, have desired surface wettabilities without requiring a surface treatment or surface modification that is associated with certain existing silicone hydrogel contact lenses.

In this specification, the structural units of the formulas [I] and [II] of the silicon-containing monomers or macromers are expressed as a block type linkage, but the present invention also comprises a random linkage type.

It is preferable from the viewpoint of polymerization that polymerizable unsaturated groups are linked to the ends of siloxane chain and structure of the unsaturated group is acrylate or methacrylate group. As a linking group to Si atoms, hydrocarbon groups containing urethane or urea linkages are preferable, and may be linked to Si atoms through oxyethylene groups. Urethane or urea linkages are highly polar and enhance the hydrophilic property and strength of the polymer. A structure having two such groups can be formed by a reaction between diisocyanate linkages and a hydroxyl- or amine-containing molecule having about 2 to about 13 carbon atoms and may be linear, cyclic or aromatic types.

There are various synthesis methods for the hydrophilic silicon-containing monomers (macromers). A number of such methods employ reagents and reactions and synthesis strategies and techniques which are conventional and well known in the art, for example, in the art of silicone polymer chemistry.

An example of a useful synthesis method comprises the following: A ring-opening polymerization of a mixture of cyclic siloxane with hydrosilane groups (Si—H), cyclic siloxane with hydrocarbon groups, and disiloxane with hydroxyalkyl groups at both ends, along with cyclic siloxane with fluorine-substituted hydrocarbon groups in certain cases, is performed using an acidic catalyst, such as sulfuric acid, trifluoromethanesulfonic acid and acidic clay to obtain hydrosilyl-group-containing polysiloxane compounds having hydroxyl groups at both ends. In this case, siloxane compounds with various degrees of polymerization and introduction ratios of fluorine-containing substituent and hydrosilyl groups can be obtained by changing feed ratios of each cyclic siloxane and disiloxane compounds used.

Isocyanate substituted acrylates or isocyanate substituted methacrylates are then reacted with hydroxyl groups at the ends of polysiloxane to obtain urethane-containing fluorinated siloxane compounds with polymerizable unsaturated groups at both ends.

The presently useful monofunctional macromers may be produced using conventional and well known chemical synthesis techniques. For example, a monofunctional hydroxyl polysiloxane, such as a commercially available monofunctional hydroxyl polysiloxane, can be reacted with an isocyanate-substituted acrylate or an isocyanate-substituted methacrylate in the presence of a catalyst, for example, tin-containing catalyst, at conditions effective to obtain a mono-terminated acrylate or methacrylate polysiloxane macromer.

Useful isocyanate-substituted methacrylates comprise, without limitation, such monomers as methacryloxyethylisocyanate, methacryloylisocyanate, and the like and mixtures thereof. Isocyanate compounds with acrylate or methacrylate groups obtained by reacting hydroxyl-group-containing acrylates or methacrylates, such as hydroxyethyl methacrylate and hydroxybutyl acrylate, with various diisocyanate compounds can also be utilized.

Hydrophilic polysiloxane monomer and/or macromers can be obtained by adding an unsaturated-hydrocarbon-group-containing hydrophilic compound to the hydrosilane using a transition metal catalyst, such as chloroplatinic acid and the like, utilizing the so called hydrosilylation reaction. In the hydrosilylation reaction, it is known that a dehydrogenation reaction occurs as a side reaction if an active hydrogen compound, such as hydroxyl group and carboxylic acid and the like, is present. Therefore, if these active hydrogen atoms are present in a hydrophilic compound to be introduced, the side reaction should be suppressed by protecting the active hydrogen atom in advance or adding buffer agents. For example, see U.S. Pat. No. 3,907,851, the disclosure of which is incorporated in its entirety by reference herein.

Another route of synthesis is as follows: After synthesis of a hydrosilyl-group-containing polysiloxane compound having hydroxyl groups at both ends, a hydrophilic group or moiety is introduced by hydrosilylation in advance, then polymerizable groups are introduced to both ends of the siloxane by reacting with isocyanate-substituted methacrylate or the like.

In this case, if active hydrogen, which is reactive to the isocyanate, is present in the hydrophilic compound, the side reaction with isocyanate must be prevented, for example, by introducing a protective group. Alternatively, for example, a silicate ester derivative, such as dimethoxy silane, a diethoxysilane compound, and the like, instead of a cyclic siloxane, can be used as a starting raw material. Mixtures of two or more hydrophilic polysiloxane monomers thus obtained can also be used.

Any polymer which comprises units from one or more hydrophilic silicon-containing monomers and/or macromers described herein can be used in the contact lenses of the present invention.

At least one hydrophilic monomer may be employed as a comonomer component in addition to the hydrophilic silicon-containing monomer or macromer. Preferably an amide monomer, for example, an amide monomer containing an N-vinyl group, is useful to obtain superior transparency, staining resistance and surface wettability. Without wishing to limit the invention to any particular theory of operation, it is believed that a phase-separated structure, on a molecular level, may be formed in the copolymerization with the hydrophilic polysiloxane monomer (macromer) or monomers (macromers) disclosed in the present invention, for example, due to differences in copolymerizability, molecular weight, polarity and the like between two or more of these monomers resulting in providing stable staining resistance, enhanced hydrophilicity and enhanced oxygen permeability, and preferably an enhanced degree of ophthalmic compatibility.

An amide monomer containing an N-vinyl group may be selected, without limitation from N-vinyl formamide, N-vinyl acetamide, N-vinyl isopropylamide, N-vinyl-N-methyl acetamide, N-vinyl pyrrolidone, N-vinyl caprolactam and the like and mixtures thereof. N-vinyl-N-methyl acetamide and N-vinyl pyrrolidone are very useful.

Useful polymeric materials in accordance with the present invention comprise copolymers obtained by addition of monomers other than the hydrophilic polysiloxane monomer(s) and the amide monomer containing N-vinyl group. Any monomer can be used in the present invention so long as it is copolymerizable, and hydrophilic monomers, among them, are useful. Useful hydrophilic monomers have good compatibility with the hydrophilic polysiloxane monomer(s) and/or macromer(s) and also can further improve surface wettability of the polymeric material and modify water content. Useful hydrophilic monomers comprise, for example and without limitation, monomers containing one or more hydroxyl groups, which monomers can improve mechanical properties, e.g., strength, elongation, tear strength and the like, such as 2-hydroxyethyl methacrylate, 2-hydroxypropyl methacrylate, 3-hydroxypropyl methacrylate, 2-hydroxybutyl methacrylate, 1-hydroxymethylpropyl methacrylate, 4-hydroxybutyl methacrylate and glycerol methacrylate; monomers containing fluorine-substituted groups such as 3-(1,1,2,2-tetrafluoroethoxy)-2-hydroxypropyl methacrylate; and acrylates corresponding to the methacrylates set forth herein. 2-hydroxyethyl methacrylate, 2-hydroxypropyl methacrylate, 2-hydroxybutyl methacrylate and mixtures thereof are very useful.

Other useful hydrophilic monomers includes, for example, and without limitation, monomers containing carboxyl groups such as methacrylic acid, acrylic acid and itaconic acid; monomers containing alky substituted amino groups such as dimethylaminoethyl methacrylate and diethylaminoethyl methacrylate; acrylamide or methacrylamide monomers such as N,N'-dimethylacrylamide, N,N'-diethylacrylamide, N-methylacrylamide, methylenebisacrylamide and diacetoneacrylamide; monomers containing oxyalkylene groups such as methoxypolyethylene glycol monomethacrylate and polypropylene glycol monomethacrylate and the like and mixtures thereof.

Siloxanyl acrylates are useful comonomers, for example, to adjust oxygen permeability. For example, such monomers comprise, without limitation, tris(trimethylsiloxy)silylpropyl methacrylate, bis(trimethylsiloxy)methylsilylpropyl methacrylate pentabmethyldisiloxanyl methacrylate and the like and mixtures thereof. Polymerizable polydimethylsiloxanes substituted with methacrylate groups and the like and mixtures thereof can also be used for the similar objective.

Other monomers, which can be utilized, comprise, without limitation, fluorinated monomers, such as fluoroalkyl acrylates and fluoroalkyl methacrylates, for example, trifluoroethyl acrylate, tetrafluoroethyl acrylate, tetrafluoropropyl acrylate, pentabfluorpropyl acrylate, hexafluorobutyl acrylate, hexafluoroisopropyl acrylate, methacrylates corresponding to these acrylates and the like and mixtures thereof.

Furthermore, alkyl acrylate monomers and alkyl methylacrylate monomers can also be used if necessary and/or desired. They comprise, for example and without limitation, methyl acrylate, ethyl acrylate, n-propyl acrylate, n-butyl acrylate, stearyl acrylate methacrylates corresponding to these acrylates and the like and mixtures thereof. In addition, monomers with high glass transition temperature (Tg), such as cyclohexyl methacrylate, tert-butyl methacrylate and isobornyl methacrylate and the like and mixtures thereof can also be used to enhance mechanical properties.

Moreover, crosslinkable monomers other than hydrophilic polysiloxane monomers can be used to improve mechanical properties and stability and adjust water content. For example, they comprise, without limitation, ethylene glycol dimethacrylate, diethylene glycol dimethacrylate, tetraethylene glycol dimethacrylate, polyethylene glycol dimethacrylate, trimehtylolpropane trimethacrylate, pentaerythritol tetramethacrylate, bisphenol A dimethacrylate, vinyl methacrylate; acrylates corresponding to these methacrylates; monomers containing one or more alkyl groups, such as, without limitation, triallyl isocyanurate, triallyl cyamurate, triallyl trimelitate and allylmethacrylate; siloxane derivatives such as 1,3-bis(3-methacryloxypropyl)tetramethyldisiloxane and the like and mixtures thereof.

Crosslinkable monomers linked with urethane group are particularly useful in providing compatibility and hydrophilicity, together with improvement of mechanical properties. Bifunctional crosslinkable monomers shown by the formula (10b) are useful:

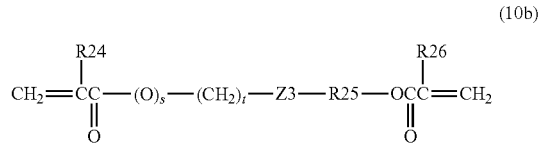

(10b)

wherein, R24 and R26 are independently selected from hydrogen and methyl group; Z3 is an urethane linking group; R25 is selected from hydrocarbon group having 2 to about 10 carbon atoms and polyoxyethylene group expressed by $-(C_2H_4O)_uC_2H_4-$ wherein u is an integer from 2 to about 40; t is an integer from 0 to about 10; s is 0 when t is 0 and 1 when t is 1 or greater.

Without wishing to limit the invention to any particular theory of operation, it is believed that the above bifunctional compounds have good compatibilities and copolymerizability and contribute to strength improvement by intermolecular interaction because the hydrophilic polysiloxane monomers have similar backbones, for example urethane group-containing backbones. Examples of crosslinkable monomers with urethane linkages including, without limitation, 2-methacryloylcarbamoyloxyethyl methacrylate, 2-2(2-methacryloxycarbamoyloxy)ethyl acrylate, 2-(2-methacryloxy-ethylcarbamoyloxy)propyl methacrylate, 2-methacryloxyethylcarbamoyloxytetraethylene glycol methacrylate and the like and mixtures thereof.

A particularly useful crosslinkable monomer shown by the formula (11b) is:

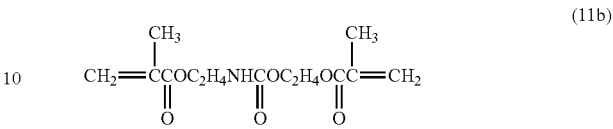

(11b)

These crosslinkable monomers can be used alone or in combination.

In order to improve a balance of characteristics of a hydrophilic polymeric material, such as optical characteristics, oxygen permeability, mechanical strength, recovery from deformation, staining resistance during contact lens wearing, dimensional stability in tear and durability, mixed monomers of these copolymerizable monomers can be used.

An example, without limitation, of such a contact lens comprises a polymer material derived from about 30% to about 70% or about 80% by weight of hydrophilic silicon-containing monomer(s) or macromer(s), about 5% to about 50% by weight of N-vinylpyrrolidone, 0% or about 0.1% to about 25% by weight of N-vinyl N-methylacetamide, 0% or about 0.1% to about 15% by weight of 2-hydroxybutyl methacrylate, 0% or about 0.1% to about 15% by weight of methyl methacrylate, and about 0.005% to about 5% by weight of a crosslinker compound. Various additives may further be added before or after polymerization, if necessary. Examples of additives comprise, without limitation, dyes or pigments with various coloring characteristics, UV absorbers and the like and mixtures thereof. Furthermore, when a lens is manufactured using a mold, mold releasing agents such as surfactants and the like and mixtures thereof can be added to improve separation of lens from the mold.

One embodiment of the present silicone hydrogel contact lenses comprises a material having the United States Adopted Name (USAN) comfilcon A.

The contact lenses of the present invention can be manufactured by conventional lens manufacturing methods. The methods include, for example a method by lathe-cutting of polymer block followed by polishing, a method to cast a monomer (and a macromer) composition into a mold with corresponding lens shape followed by polymerization, and a method to form only one face of lens by casting method using a polymerization mold then finish the other face by lathe-cutting and polishing method, etc.

A polymeric material used for a contact lens of the present invention is formed to an ophthalmologic lens by a mold method in which a monomer mixture comprising, for example, one or more hydrophilic polysiloxane monomers and an amide monomer containing N-vinyl group, is filled into a mold, followed by a radical polymerization by the known method, or by a spin casting method in which a monomer mixture is fed in a rotatable hemisphere mold, followed by a polymerization. In these cases, polymerization of a solution of monomer mixture added with solvents in a mold may be utilized to adjust the degree of polymerization or lens swelling ratio. If a solvent is included, solvents which dissolve the monomers effectively are advantageously used. Examples include, without limitation alcohols such as ethanol and isopropanol; ethers such as dimethylsulfoxide, dimethylformamide, dioxane and tetrahydrofuran; ketones such as methylethyl ketone; esters such as ethyl acetate; and the like and mixtures thereof.

Any mold material can be used for mold polymerization or casting polymerization, so long as it is substantially insoluble to monomer mixture and lens can be separated after polymerization. For example, polyolefin resins such as polypropylene and polyethylene can be used, and materials having polar groups at a surface are preferable. As used herein, a polar group means an atomic group with strong affinity with water and comprises hydroxyl groups, nitrile groups, carboxyl groups, polyoxyethylene groups, amide groups, urethane groups and the like. Very useful mold materials are insoluble to a polymerization monomer composition and have contact angles to water at least at the part for forming one lens surface, not higher than about 90°, preferably about 65° to about 80°, by the sessile drop method. A contact lens formed using a mold material having surface contact angle smaller than 80° shows particularly superior water wettability and stable performance in lipid deposition and the like. A mold material having surface contact angle smaller than 65° is not advantageous because of difficulty in separating from the mold after polymerization, resulting in minute surface damage or fractures at an edge part of lens. A mold material soluble to monomer compositions is also difficult to use because of difficulty in separating the lens as well as rough lens surfaces and low transparency.

More preferably, a mold material is a resin selected from polyamides, polyethylene terephthalates and ethylene-vinyl alcohol copolymers (EVOH) and the like. Ethylene-vinyl alcohol copolymers are particularly useful, for example, from the viewpoints of an easiness in molding, providing a dimensionally stable mold and giving stable water wettability to the molded lens. An example of an ethylene-vinyl alcohol copolymer resin product to be used is available as "Soarlite" from The Japan Synthetic Chem. Ind. Co. Ltd. or "EVAL" from Kuraray Co., Ltd. Various grades of EVOH with ethylene copolymerization ratio of about 25-50% by mole can be used in the present invention.

As for initiating polymerization, a photopolymerization method may be used to initiate polymerization by UV or visible light irradiation in the presence of photopolymerization initiators in a monomer mixture, or a radical polymerization method to thermally polymerize using azo compounds or organic peroxides. Examples of photopolymerization initiators comprise, without limitation, benzoin ethyl ether, benzyl dimethyl ketal, alpha,alpha'-diethoxy acetophenone, 2,4,6-trimethylbenzoyl diphenyl phosphine axide, and the like and mixtures thereof. Examples of organic peroxide comprise, without limitation, benzoin peroxide, t-butyl peroxide and the like and mixtures thereof. Examples of azo compounds comprise, without limitation, azobisisobutyronitorile, azobisdimethylvaleronitorile and the like and mixtures thereof. Among them, a photopolymerization method is very useful due to providing a stable polymerization in a short cycle time.

The surfaces of the molded lens may be modified, if desired, by applying plasma treatment, ozone treatment, corona discharge, chemical reaction and/or other treatment, graft polymerization or the like to increase surface wettability, that is, to increase the wettability of the surface or surfaces of the lens, for example, after molding the lens. Examples of such surface treatments are disclosed in Chabrecek et al U.S. Pat. No. 6,436,481. However, in a preferred embodiment, the present contact lenses have highly advantageous combinations of properties without requiring any surface treatment or modification, for example, surface treatment or modification to increase surface wettability.

The present contact lenses may be in any suitable configuration effective to satisfy the needs of the lens wearer. For example, the present lenses may have a single refractive power or two or more refractive powers, such as a bifocal or multifocal lens, or may have no refractive power. The present lenses can provide spherical corrections, aspherical corrections, cylinder corrections, wave front corrections, corrections of aberrations and the like. Without limitation, examples of useful cylinder correction lenses which may be formed in accordance with the present invention are disclosed in Back U.S. Pat. No. 6,467,903. The present lenses can be configured to be rotationally stabilized, for example, including ballasts, other rotationally stabilizing features and the like. The present lenses can be untinted, tinted, colored, for example, with iris-simulating patterns, and the like. The present lenses can have any suitable edge geometries, such as rounded edges, for example, fully rounded edges from posterior face to anterior face, rounded edges which include portions of the anterior face or the posterior face of the lens and the like. Such rounded edges or edge portions are very useful in enhancing the comfort and safety of wearing the present contact lenses, particularly during extended wear of such contact lenses. Without limitation, examples of useful contact lenses with rounded edges which may be formed in accordance with the present invention are disclosed in Dean U.S. Pat. No. 6,431,706.

Evaluation methods for lens characteristics in the Examples and the Comparative Examples are as follows:

Advancing/Receding Contact Angles

The advancing contact angles and receding contact angles of the contact lenses were measured using a conventional drop shape method.

Static Angles

The static angles of the contact lenses were measure using the conventional captive bubble method.

Water Content

A soft contact lens was immersed in phosphate buffered saline (PBS) solution at 23° C. for more than 16 hours. After taking out and quick wiping off of surface water, the lens was weighed precisely. The lens was then dried at 80° C. in a vacuum dryer to a constant weight. Water content was calculated from a weight change as follows:

$$\text{water content} = (\text{weight difference}/\text{weight before drying}) \times 100 (\%)$$

Oxygen Permeability (Dk Value)

Dk value was determined by the so-called Mocon Method, for example using a test instrument commercially available under the model designation of Mocon Ox-Tran System. This method is described in Tuomela et al U.S. Pat. No. 5,817,924, the disclosure of which is hereby incorporated in its entirety herein by reference.

The Dk value is expressed as barrers or $10^{-10}$ (ml $O_2$ mm)/(cm$^2$ sec mm Hg).

Tensile Modulus

Test pieces of about 3 mm width were cut out from a central part of lens and tensile modulus (unit; MPa or $10^7$ dyne/cm$^2$) was determined from an initial slope of a stress-strain curve obtained by tensile test at the rate of 100 mm/min in physiological saline solution at 25° C., using Autograph (Model AGS-50B manufactured by Shimadzu Corp.).

Ionoflux

The ionoflux of a contact lens or lens body is measured using a technique substantially similar to the so-called "Ionoflux Technique" described in Nicolson et al U.S. Pat. No. 5,849,811, the disclosure of which is hereby incorporated in its entirety herein by reference.

Elongation

The elongation of a contact lens or lens body is measured in the fully hydrated state. This measurement is conducted in a substantially conventional/standard way and involves pulling the specimen employing an Instron Machine.

Other Mechanical Properties

Other mechanical properties such as tensile strength, tear strength, and the like, were measured using well known and standardized testing techniques.

EXAMPLES

The following non-limiting examples illustrate various aspects and features of the present invention Synthesis Example 1

[Synthesis of Polysiloxanediol Having Hydrosilane Groups (A1)]

A mixture of 150 gms of octamethylcyclotetrasiloxane, 22.6 gms of 1,3,5-trimethyltrifluoropropyl-cyclotrisiloxane, 5.2 gms of 1,3,5,7-tetramethyl-cyclotetrasiloxane, 9.8 gms of 1,3-bis(3-(2-hydroxyethoxy)propyl)tetramethyldisiloxane, 200 gms of chloroform and 1.5 gms of trifluoromethane sulfonic acid was stirred for 24 hours at 25° C., then washed repeatedly with purified water until a pH of the mixture became neutral. After water was separated, chloroform was distilled off under the reduced pressure. The residual liquid was dissolved in acetone (36 gms), reprecipitated with methanol (180 gms), followed by removal of volatile components under vacuum from a separated liquid to give a transparent viscous liquid. The said liquid was the siloxanediol having hydrosilane groups expressed by the following formula (H3R) with a yield of 125 gms. Here, although the structural formula of the linking group Y is shown as a block structure composed of each siloxane unit, actually it contains random structures, and this formula shows only a ratio of each siloxane unit. This is true throughout the Synthesis Examples.

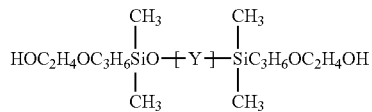

wherein,

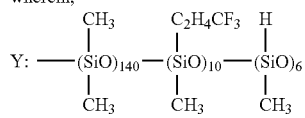

A mixture of 125 gms of the siloxanediol described above, 40 gms of polyethyleneglycol allylmethylether (average molecular weight is 400), 250 gms of isopropyl alcohol, 0.12 gms of potassium acetate, and 25 mg of chloroplatinic acid was charged into a flask with a reflux condensor and heated with stirring for 3 hours under reflux. The reaction mixture was filtered, then isopropanol was distilled off under reduced pressure, followed by washing several times with a mixture of methanol/water. Further removal of volatile components under a vacuum gave a transparent viscous liquid with a yield of 120 gms. The liquid was a siloxanediol without hydrosilane groups (M3R), expressed by the following formula:

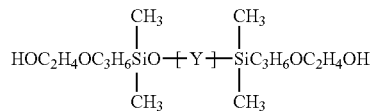

wherein,

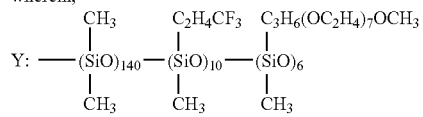

A mixture of 120 gms of the siloxanediol (M3R) described above, 9.5 gms of methacryloyloxyethyl isocyanate, 120 gms of dry 2-butanone and 0.05 gms of dibutyltin dilaurate was poured in a brown-colored flask and stirred for 5 hours at 35° C., then further stirred after an addition of 6 gms of methanol. Subsequently, 2-butanone was distilled off under reduced pressure, and the resulting liquid was washed several times with a mixture of methanol/water followed by removal of volatile components under vacuum to give a transparent viscous liquid with a yield of 120 gms. The liquid was the polysiloxane-dimethacrylate (M3-U) expressed by the following formula:

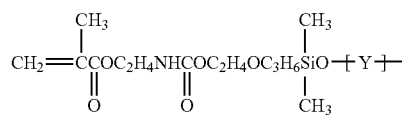

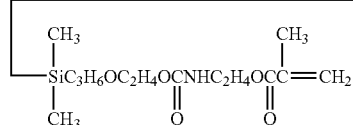

wherein,

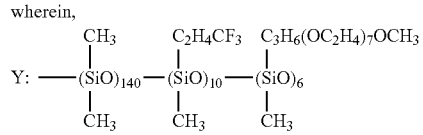

This material, identified as M3-U, has a number average molecular weight of about 15,000.

Synthesis Example 1A

Synthesis Example 1 is repeated with appropriate adjustments to the amounts of the components and/or conditions utilized to provide a macromer structured similarly to M3-U except that Y has the following structure:

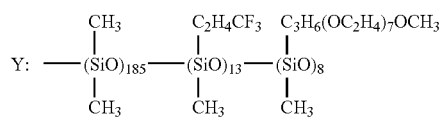

This material, identified as M3-UU, has a number average molecular weight of about 20,000.

Synthesis Example 2

A mixture of 50 gms of alpha-butyl-omega-[3-(2'hydroxy-ethoxy)propyl)polydimethylsiloxane, 10 gms of methacryloyloxyethyl isocyanate, 150 gms of dry n-hexane and 0.2 gms of dibutyltin dilaurate was poured in a brown-colored flask and heated for 2 hours under reflux, then further stirred after an addition of 6 gms of methanol. Subsequently, n-hexane was distilled off under reduced pressure, and the resulting liquid was washed several times with methanol (30 gms)/water (15 gms) followed by removal of volatile components under vacuum to give a transparent viscous liquid with a yield of 54 gms. The liquid was the polysiloxane-methacrylate (FMM) expressed by the following formula.

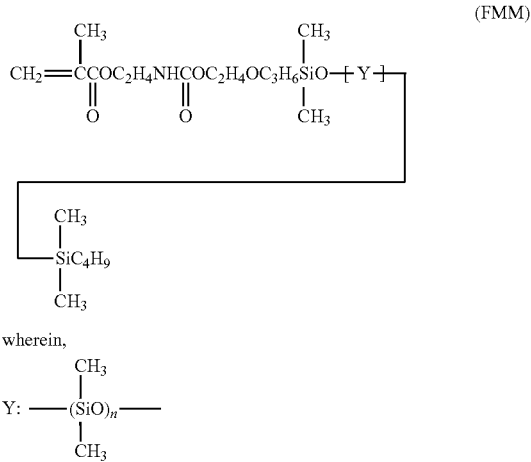

This material, identified as FMM, has a number average molecular weight of about 1500.

Example 3

A mixture of 64 parts by weight of M3-U the polysiloxane described in the Synthesis Example 1A, 10 parts by weight of N-vinyl-2-pyrrolidone (hereinafter NVP), 10 parts by weight of N-vinyl-N-methylacetamide (hereinafter "VMA"), 6 parts by weight of isobornyl methacrylate (hereinafter "IBM"), 10 parts by weight of methyl methacrylate (hereinafter "MMA"), 0.1 parts by weight of triallyl isocyanurate (hereinafter "TAIC"), and 0.1 parts by weight of 2,4,6-trimethyl-benzoyl-diphenylphosphine oxide (hereinafter "TPO"), which was added last to the mixture, was mixed with stirring. The mixture was injected into a mold for forming a contact lens made of an ethylene vinyl alcohol resin (hereinafter "EVOH resin") (made by The Japan Synthetic Chem. Ind. Co., Ltd., Soarlite S), then irradiated by ultraviolet (UV) light for 1 hour in a light exposure equipment to give a lens-shaped polymer. The lens thus obtained was soaked in ethyl alcohol for 1.5 hours, then soaked in fresh ethyl alcohol for an additional 1.5 hours, than soaked in an ethyl alcohol/water (1/1) mixture for 0.5 hours, soaked in deionized water for 3 hours, and then placed in PBS solution, and followed by autoclaving for 20 mins. The lens thus obtained was transparent and flexible, and showed good water wettability. Evaluation of physical properties showed results set forth in Table 1.

Examples 4, 5 and 6

Example 3 was repeated three times except that the mixtures formed had the compositions shown in Table 1. Each of the lenses thus obtained was transparent and flexible, and showed good water wettability. Evaluation of physical properties showed results set forth in Table 1.

Examples 7, 8, 9 and 10

Example 3 was repeated four additional times except that the mixture formed had the components and compositions shown in Table 1. In each of these examples, 10 parts by weight of FMM was included. Thus, each of the mixtures comprise one silicon-containing macromer having a molecular weight of about 15,000, and another silicon-containing macromer having a molecular weight of about 1,400. Each of the lenses thus obtained was transparent and flexible, and showed good water wettability. Evaluation of physical properties showed results set forth in Table 1.

Example 11

A lens was prepared in accordance with Example 5.
The hydrated lens was placed into a 2% by weight aqueous solution of glycerol monomethacrylate (GMMA)/glycerol dimethacrylate (GDMA) (97/3 by weight). The solution, with the lens included, was degassed and purged with nitrogen for 15 minutes. The aqueous solution was gently agitated to maintain hydration. The solution was heated to 70° C. for 40 minutes. An aqueous solution of 2,2'-azobis(2-amidinopropane dihydrochloride (Vazo 56) was added to the lens/solution. Polymerization was allowed to occur for 30 minutes. The lens was removed and repeatedly rinsed/soaked with deionized water. The lens thus obtained was transparent and flexible, and showed good water wettability. Evaluation of physical properties showed results set forth in Table 1.

Comparative Examples 12 and 13

Two commercially available extended wear contact lenses were chosen for property testing. Evaluation of physical properties of these two lenses showed results set forth in Table 1.

TABLE 1

| Component Identification | | | Composition (Mass % or Relative Parts) Examples | | | | | | | | | | |
|---|---|---|---|---|---|---|---|---|---|---|---|---|---|
| Component | Abbrev | Description | 3 | 4 | 5 | 6 | 7 | 8 | 9 | 10 | 11 | 12 | 13 |
| Silicone Macromer | M3-U | Polysiloxanyl dimeth. MW = about 15,000 Imparts high Dk | 64 | 64 | 66 | 60 | 42 | 42 | 44 | 44 | 66 | | |

TABLE 1-continued

| Component | Abbrev. | Description | Ex3 | Ex4 | Ex5 | Ex6 | Ex7 | Ex8 | Ex9 | Ex10 | Ex11 |
|---|---|---|---|---|---|---|---|---|---|---|---|
| Silicone Macromer | FM0411M | Polysiloxanyl dimeth. MW = about 1500 Imparts high Dk | | | | | 10 | 10 | 10 | 10 | |
| N-Vinyl 2-pyrrolidinone | NVP | Hydrophilic monomer | 10 | 10 | 10 | 10 | 30 | 30 | 30 | 40 | 10 |
| N-Vinyl-N-methylacetamide | VMA | Hydrophilic monomer | 10 | 12 | 18 | 20 | 10 | 10 | 10 | 0 | 18 |
| 2-Hydroxybutyl methacrylate | HOB | Hydrophilic monomer | | | | 6 | 10 | 10 | 10 | 10 | |
| Glycerol monomethacrylate | GMMA | Hydrophilic monomer (IPN Process) | | | | | | | | | see text |
| Glycerol dimethacrylate | GDMA | Hydrophilic monomer Crosslinking agent (IPN) | | | | | | | | | see text |
| Isobornyl methacrylate | IBM | Hydrophobic monomer | 6 | 6 | 6 | | 6 | 6 | 6 | 6 | 6 |
| Methyl methacrylate | MMA | Hydrophobic monomer | 10 | 8 | | | | | | | |
| Triallyl isocyanurate | TAIC | Crosslinking agent | 0.1 | 0.1 | 0.1 | | | 0.1 | 0.1 | 0.1 | |
| Tetraethylene glycol dimethacrylate | 4ED | Crosslinking agent | | | | 4 | 2 | 1 | | | |
| Bis(2-ethylhexyl)sulfosuccinate sodium salt | Aerosol OT (AOT) | Nonreactive surfactant (aids demolding) | 0 | 0 | 0.5 | 0.5 | 0.5 | 0.5 | 0.5 | 0.5 | 0.5 |
| Diphenyl(2,4,6-trimethylbenzoyl) phosphine oxide | Lucirin TPO | UV Photo-initiator | 0.1 | 0.1 | 0.1 | 0.1 | 0.1 | 0.1 | 0.1 | 0.1 | 0.1 |
| 2,2'-azobis(2-amidino propane) Dihydrochloride | Vazo 56 | Thermal initiator Water soluble | | | | | | | | | 0.1 |

| Properties | Units | Ex3 | Ex4 | Ex5 | Ex6 | Ex7 | Ex8 | Ex9 | Ex10 | Ex11 | B&L Pure Vision | Ciba Night and Day |
|---|---|---|---|---|---|---|---|---|---|---|---|---|
| EWC (Equil. Water Content) | % | 34 | 37 | 44 | 36 | 36 | 38 | 44 | 42 | 42 | 36 | 24 |
| Dk | * | 199 | | 250 | 200 | 278 | 277 | 196 | 188 | 220 | 100 | 140 |
| Modulus | MPa | 1.0 | 0.8 | 0.9 | 1.2 | 1.2 | 1.0 | 0.6 | 0.5 | 0.9 | 1.0 | 1.2 |
| Elongation | % | 350 | 290 | 220 | 130 | 190 | 251 | 357 | 355 | | 193 | 271 |
| Tear Strength | N | 69 | 59 | 32 | 23 | 64 | 69 | 83 | 96 | | 183 | 163 |
| Tb (Stress @ break) | MPa | 2.3 | 1.7 | 1.6 | 1.3 | 1.9 | 2.2 | 2.3 | 2.0 | | 2.0 | 2.1 |
| Ionoflux | $10^{-3}$ mm$^2$/min | 0.2 | 0.3 | 2.8 | 1.1 | 1.1 | 2.2 | 3.5 | 3.0 | | 5.0 | 0.5 |
| Surface Modified | Yes or No | No | No | No | No | No | No | No | No | No | Yes | Yes |

The present contact lenses, that is the contact lenses of Examples 3 through 11, have unique and advantageous combinations of physical properties which make each of such lenses highly effective in continuous or extended wear applications, particularly when considered in comparison to the comparative commercially available lenses of Examples 12 and 13.

Each of the lenses produced in Examples 3 to 11, after appropriate processing to remove extractable material and to hydrate the lens in preparation for wear in a human eye, is placed in a human eye and worn for six (6) hours. After this period of time, the lens is removed and the eye is tested for corneal staining. Each of these lenses resulted in less than about 20% corneal staining.

Each of the lenses in Examples 3 to 11 has a combination of properties, for example, including water content, oxygen permeability, modulus and/or one or more other mechanical-related properties, and ionoflux, which provides for enhanced performance, for example, in terms of lens function effectiveness, wearer comfort and safety, in continuous wear applications. The combinations of physical properties of the lenses of Examples 3 to 11 are unmatched, for example, by the competitive lenses of Examples 12 and 13.

The lenses of Examples 3 to 11 are ophthalmically compatible during continuous wear for at least about 5 days or about 10 days or about 20 days or about 30 days. For example, such lenses do not adhere to the cornea during such continuous wear.

In short, the present contact lenses of Examples 3 to 11 illustrate the substantial continuous wear advantages of embodiments of the present invention.

Examples 14 to 21

A series of different contact lenses were provided. The static angle (using the conventional captive bubble test for static angle), and advancing contact angle and receding contact angle for each lens were measured using conventional methods. The advancing contact angles and receding contact angles were measured using a conventional drop shape method.

Prior to making the contact angle measurements, the contact lens was soaked in phosphate buffered saline (PBS) (pH 7.2) for at least 10 minutes.

In addition, the contact angle hysteresis, that is the difference between the advancing contact angle and the receding contact angle, and the sum of the advancing contact angle and the receding contact angle, hereinafter referred to as the Sum, were also calculated.

Results of these measurements and calculations are shown in the following Table 2.

TABLE 2

CONTACT ANGLE MEASUREMENTS

| Lens Example | Static Angle, ° | Advancing Angle, ° | Receding Angle, ° | Hysteresis, ° | Sum[a], ° |
|---|---|---|---|---|---|
| 14[1] | 34.5 (±0.9, n = 4) | 67.4 (±2.8, n = 4) | 51.6 (±4.1, n = 4) | 15.6 | 119 |
| 15[2] | 36.3 (±5.4, n = 4) | 70.0 (±0.7, n = 4) | 51.0 (±0.7, n = 4) | 19.0 | 121 |
| 16[3] | 41.9 (±0.7, n = 4) | 95.4 (±5.3, n = 4) | 49.2 (±1.2, n = 4) | 46.2 | 144.6 |
| 17[4] | 27.3 (±10.3, n = 3) | 95.9 (±5.3, n = 3) | 49.2 (±0.3, n = 3) | 46.7 | 145.1 |
| 18[5] | 31.4 (±1.2, n = 4) | 55.5 (±1.3, n = 4) | 45.4 (±0.6, n = 4) | 10.0 | 100.9 |
| 19[6] | 44.5 (±1.0, n = 4) | 63.4 (±1.9, n = 4) | 46.8 (±0.9, n = 4) | 16.6 | 110.2 |
| 20[7] | 42.2 (±1.6, n = 4) | 73.1 (±2.8, n = 4) | 47.8 (±1.0, n = 4) | 25.3 | 120.9 |
| 21[8] | 43.3 (±2.0, n = 4) | 62.2 (±4.0, n = 4) | 49.5 (±0.9, n = 4) | 12.7 | 112.7 |

[a]Sum is the total of the advancing contact angle plus the receding contact angle.
[1]Example 14 lenses are silicone hydrogel contact lenses sold by Ciba Vision under the trade name Focus Night and Day. These lenses have treated or modified surfaces.
[2]Example 15 lenses are silicone hydrogel contact lenses sold by Ciba Vision under the trade name O₂ Optix. These lenses have treated or modified surfaces.
[3]Example 16 lenses are silicone hydrogel contact lenses sold by Bausch & Lomb under the trade name Pure Vision. These lenses have treated or modified surfaces.
[4]Example 17 lenses are silicone hydrogel contact lenses sold by Johnson & Johnson under the trade name Acuvue Advance. These lenses do not have treated or modified surfaces, but they do have a polyvinylpyrrolidone (PVP) internal wetting agent.
[5]Example 18 lenses are silicone hydrogel contact lenses comprising the components/ingredients of the lenses of Example 9. These lenses do not have treated or modified surfaces.
[6]Example 19 lenses are hydrogel contact lenses that include no silicon (or silicone polymeric material) and are sold by CooperVision under the trademark Proclear ®. These lenses do not have treated or modified surfaces.
[7]Example 20 lenses are silicone hydrogel contact lenses obtained from polymerizable lens precursor composition comprising about 30% decylalcohol polymerized in polypropylene contact lens molds. These lenses do not have treated or modified surfaces.
[8]Example 21 lenses are hydrogel contact lenses that include no silicon (or silicone polymeric material) and are sold by CooperVision under the trademark BioMedics ® 55.

These results show that the contact lens of Example 18, a contact lens in accordance with the present invention, advantageously has a reduced advancing contact angle and/or receding contact angle and/or contact angle hysteresis and/or Sum relative to all of the other lenses tested or measured.

In particular, it is surprising to note that the silicone hydrogel lens of Example 18, which does not have treated or modified surfaces, has reduced advancing and receding contact angles, and a reduced contact angle hysteresis and a reduced Sum relative to the commercially available silicone hydrogel lenses of Examples 14, 15 and 16, each of which has treated or modified surfaces. Thus, the silicone hydrogel lens of Example 18, in accordance with the present invention, provides enhanced surface wettability without surface treatment or modification relative to silicone hydrogel lenses with treated or modified surfaces.

In addition, the silicone hydrogel lens of Example 18 advantageously has reduced advancing and receding contact angles, a reduced contact angle hysteresis and a reduced Sum relative to the silicone hydrogel contact lens of Example 17, which also has no surface treated or modified surfaces.

In view of the disclosure herein, it can be appreciated that the present contact lenses comprise one or more features that are different than other, for example, existing commercially available, silicone hydrogel contact lenses. In one embodiment of the present lenses, the lens body has a water content of about 50% (such as 47% or about 48%) and a ionoflux between about 4 and about 5. In additional embodiments, such a lens body has a Dk greater than 100.

The disclosure of U.S. Pat. No. 6,867,245 is hereby incorporated in its entirety herein by reference.

A number of publications, patents, and patent applications have been cited hereinabove. Each of the cited publications, patents, and patent applications is hereby incorporated by reference in its entirety.

While this invention has been described with respect to various specific examples and embodiments, it is to be understood that the invention is not limited thereto and that it can be variously practiced within the scope of the following claims.

What is claimed is:

1. A contact lens comprising:
a soft lens body having an anterior surface and a posterior surface at least one of which is not surface treated, the lens body comprising at least one hydrophilic silicon-containing polymeric material and having a water content of at least about 30% by weight, a contact angle hysteresis of less than 15° and a modulus of less than about 0.8 MPa, wherein the contact angle hysteresis is the difference between an advancing contact angle of the lens body and a receding contact angle of the lens body.

2. The contact lens of claim 1 which is a silicone hydrogel contact lens.

3. The contact lens of claim 1, wherein the lens body has an advancing contact angle of about 70° or less.

4. The contact lens of claim 1, wherein the lens body has an advancing contact angle of about 60° or less.

5. The contact lens of claim 1, wherein the lens body has a contact angle hysteresis of less than 13°.

6. The contact lens of claim 1, wherein the lens body has an oxygen permeability, a water content, a surface wettability, a modulus, and a design effective in facilitating ophthalmically compatible wearing of the contact lens by the lens wearer at least for one day.

7. The contact lens of claim 1, wherein the lens body has an oxygen permeability, a water content, a surface wettability, a modulus, and a design effective in facilitating ophthalmically compatible wearing of the contact lens by the lens wearer for about thirty days.

8. The contact lens of claim 1, wherein the lens body has an oxygen permeability of at least about 50 barrers.

9. The contact lens of claim 1, wherein the lens body has an oxygen permeability of at least about 120 barrers.

10. The contact lens of claim 1, wherein both the anterior and posterior surfaces are not surface treated.

11. The contact lens of claim 1, wherein the lens body has an ionoflux of no greater than about $5 \cdot 10^{-3}$ mm$^2$/min.

12. A contact lens comprising:
a soft lens body having an anterior surface and a posterior surface at least one of which is not surface treated, the lens body comprising at least one hydrophilic silicon-containing polymeric material and having a water content of at least about 30% by weight, a receding contact angle of 49° or less, a contact angle hysteresis of 45° or less, and a modulus of less than about 0.8 MPa, wherein the contact angle hysteresis of the lens body is the difference between an advancing contact angle of the lens body and the receding contact angle of the lens body.

13. The contact lens of claim 12, which is a silicone hydrogel contact lens.

14. The contact lens of claim 12, wherein the contact angle hysteresis of the lens body is about 30° or less.

15. The contact lens of claim 12, wherein the lens body has an oxygen permeability, a water content, a surface wettability, a modulus, and a design effective in facilitating ophthalmically compatible wearing of the contact lens by the lens wearer at least for one day.

16. The contact lens of claim 12, wherein the lens body has an oxygen permeability, a water content, a surface wettability, a modulus, and a design effective in facilitating ophthalmically compatible wearing of the contact lens by the lens wearer for about thirty days.

17. The contact lens of claim 12, wherein the lens body has an oxygen permeability of at least about 50 barrers.

18. The contact lens of claim 12, wherein the lens body has an oxygen permeability of at least about 120 barrers.

19. The contact lens of claim 12, wherein both the anterior and posterior surfaces are not surface treated.

20. A contact lens comprising:
a soft lens body having an anterior surface and a posterior surface which are not surface treated, the lens body comprising at least one hydrophilic silicon-containing polymeric material and having a water content of at least about 30% by weight, a modulus less than 1 MPa, an advancing contact angle and a receding contact angle, the sum of the advancing contact angle and the receding contact angle being in a range of more than 94° to less than 117°, and a contact angle hysteresis of less than 30°, wherein the contact angle hysteresis is the difference between an advancing contact angle of the lens body and a receding contact angle of the lens body.

21. The contact lens of claim 20 which is a silicone hydrogel lens.

22. The contact lens of claim 20, wherein the sum of the advancing contact angle and the receding contact angle is in a range of 95° to 115°.

23. The contact lens of claim 20, wherein the sum of the advancing contact angle and the receding contact angle is about 110° or less.

24. The contact lens of claim 20, wherein the contact angle hysteresis is less than 20°.

25. The contact lens of claim 20, wherein the advancing contact angle is less than about 90°.

26. The contact lens of claim 20, wherein the advancing contact angle is less than about 65°.

27. The contact lens of claim 20, wherein the lens body has an oxygen permeability, a water content, a surface wettability, a modulus, and a design effective in facilitating ophthalmically compatible wearing of the contact lens by the lens wearer at least for one day.

28. The contact lens of claim 20, wherein the lens body has an oxygen permeability, a water content, a surface wettability, a modulus, and a design effective in facilitating ophthalmically compatible wearing of the contact lens by the lens wearer for about thirty days.

29. The contact lens of claim 20, wherein the lens body has an oxygen permeability of at least about 50 barrers.

30. The contact lens of claim 20, wherein the lens body has an oxygen permeability of at least about 120 barrers.

31. The contact lens of claim 20, wherein the lens body has a modulus less than about 0.8 MPa.

32. The contact lens of claim 1, wherein the sum of the advancing contact angle and the receding contact angle of the lens body is in a range of more than 94° to less than 117°.

33. The contact lens of claim 1, wherein the lens body results in corneal staining incidences of less than about 30% after the contact lens is continuously worn during an overnight sleep, based on a representative population of lens wearers.

34. The contact lens of claim 1, wherein the lens body is a polymerized reaction product of a precursor composition consisting essentially of copolymerizable monomers.

35. The contact lens of claim 12, wherein the sum of the advancing contact angle and the receding contact angle being in a range of more than 94° to less than 117°.

36. The contact lens of claim 12, wherein the lens body results in corneal staining incidences of less than about 30% after the contact lens is continuously worn during an overnight sleep, based on a representative population of lens wearers.

37. The contact lens of claim 12, wherein the lens body is a polymerized reaction product of a precursor composition consisting essentially of copolymerizable monomers.

38. The contact lens of claim 20, wherein the lens body results in corneal staining incidences of less than about 30% after the contact lens is continuously worn during an overnight sleep, based on a representative population of lens wearers.

39. The contact lens of claim 20, wherein the lens body is a polymerized reaction product of a precursor composition consisting essentially of copolymerizable monomers.

* * * * *

UNITED STATES PATENT AND TRADEMARK OFFICE
CERTIFICATE OF CORRECTION

PATENT NO. : 8,367,746 B2
APPLICATION NO. : 11/525106
DATED : February 5, 2013
INVENTOR(S) : Arthur Back et al.

Page 1 of 1

It is certified that error appears in the above-identified patent and that said Letters Patent is hereby corrected as shown below:

TITLE PAGE: Item 75 should read

Arthur Back, Danville, CA (US); Junichi Iwata, Nobeoka-shi (JP); Tsuneo Hoki, Nobeoka-shi (JP); Seiichiro Ikama, Nobeoka-shi (JP)

Signed and Sealed this
Twenty-fourth Day of March, 2015

Michelle K. Lee
*Director of the United States Patent and Trademark Office*

UNITED STATES PATENT AND TRADEMARK OFFICE
CERTIFICATE OF CORRECTION

PATENT NO. : 8,367,746 B2  Page 1 of 1
APPLICATION NO. : 11/525106
DATED : February 5, 2013
INVENTOR(S) : Arthur Back et al.

It is certified that error appears in the above-identified patent and that said Letters Patent is hereby corrected as shown below:

TITLE PAGE: Item 75 should read

Arthur Back, Danville, CA (US); Junichi Iwata, Nobeoka-shi (JP);Tsuneo Hoki, Nobeoka-shi (JP); Seiichiro Ikawa, Nobeoka-shi (JP)

Signed and Sealed this
Twenty-first Day of July, 2015

Michelle K. Lee
*Director of the United States Patent and Trademark Office*